(12) United States Patent
Malackowski et al.

(10) Patent No.: US 8,787,877 B1
(45) Date of Patent: *Jul. 22, 2014

(54) SYSTEM OF PROVIDING INFORMATION TO A TELEPHONY SUBSCRIBER

(75) Inventors: James E. Malackowski, Chicago, IL (US); Kristi L. Stathis, Chicago, IL (US)

(73) Assignee: Single Touch Interactive, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,508

(22) Filed: Sep. 20, 2011

Related U.S. Application Data

(63) Continuation of application No. 12/871,154, filed on Aug. 30, 2010, now Pat. No. 8,041,341, which is a continuation of application No. 10/989,817, filed on Nov. 16, 2004, now Pat. No. 7,813,716, which is a continuation of application No. 10/984,166, filed on Nov. 9, 2004, now Pat. No. 7,181,200, which is a continuation of application No. 10/453,452, filed on Jun. 3, 2003, which is a continuation of application No. 10/104,197, filed on Mar. 22, 2002, now abandoned, said application No. 10/453,452 is a continuation of application No. 10/104,867, filed on Mar. 22, 2002, now Pat. No. 6,839,556, said application No. 10/104,197 is a continuation-in-part of application No. 08/998,183, filed on Dec. 24, 1997, now Pat. No. 6,397,057, which is a continuation of application No. 08/475,800, filed on Jun. 7, 1995, now Pat. No. 5,752,186.

(51) Int. Cl.
*H04M 1/66* (2006.01)

(52) U.S. Cl.
USPC ............... 455/411; 455/404.1; 455/414.2; 455/414.1; 455/414.3; 455/412.1; 455/415

(58) Field of Classification Search
USPC ............ 455/411, 404.1, 414.2, 414.1, 414.3, 455/412.1, 415
See application file for complete search history.

(56) References Cited

U.S. PATENT DOCUMENTS

| | | |
|---|---|---|
| 3,600,522 A | 8/1971 | Benson |
| 3,975,595 A | 8/1976 | Berube et al. |
| 4,600,812 A | 7/1986 | Gerlits |
| 4,723,212 A | 2/1988 | Mindrum et al. |
| 4,757,267 A | 7/1988 | Riskin |
| 4,812,843 A | 3/1989 | Champion, III et al. |
| 4,817,135 A | 3/1989 | Winebaum |
| 4,847,886 A | 7/1989 | Chumley |
| 4,910,672 A | 3/1990 | Off et al. |
| 4,926,255 A | 5/1990 | Von Kohorn |

(Continued)

OTHER PUBLICATIONS

Office Action for U.S. Appl. No. 13/275,072, System of Providing Information to a Telephony Subscriber, dated Feb. 23, 2012, 9 pages.

(Continued)

*Primary Examiner* — Justin Lee
(74) *Attorney, Agent, or Firm* — Polsinelli Pc

(57) ABSTRACT

An information fulfillment system provides information to a user having a wireless communication device. Upon manual or automatic input of an access code to the wireless communication device, the fulfillment center delivers information based on the access code. Automatic verification, connection, and/or billing modification processes are provided for implementation of the system and method.

90 Claims, 11 Drawing Sheets

(56) References Cited

U.S. PATENT DOCUMENTS

| | | | |
|---|---|---|---|
| 5,027,400 A | 6/1991 | Baji et al. | |
| 5,131,020 A | 7/1992 | Liebesny et al. | |
| 5,132,992 A | 7/1992 | Yurt et al. | |
| 5,142,654 A | 8/1992 | Sonberg et al. | |
| 5,151,782 A | 9/1992 | Ferraro | |
| 5,173,851 A | 12/1992 | Off et al. | |
| 5,214,793 A | 5/1993 | Conway et al. | |
| 5,216,703 A | 6/1993 | Roy | |
| 5,218,629 A | 6/1993 | Dumond, Jr. et al. | |
| 5,247,347 A | 9/1993 | Litteral et al. | |
| 5,282,238 A | 1/1994 | Berland | |
| 5,283,731 A | 2/1994 | Lalonde et al. | |
| 5,285,278 A * | 2/1994 | Holman | 725/23 |
| 5,301,227 A | 4/1994 | Kamei et al. | |
| 5,307,400 A | 4/1994 | Sawyer et al. | |
| 5,313,515 A | 5/1994 | Allen et al. | |
| 5,365,582 A | 11/1994 | Yamada et al. | |
| 5,381,467 A | 1/1995 | Rosinski et al. | |
| 5,418,844 A * | 5/1995 | Morrisey et al. | 379/221.09 |
| 5,422,656 A | 6/1995 | Allard et al. | |
| 5,440,336 A | 8/1995 | Buhro et al. | |
| 5,442,390 A | 8/1995 | Hooper et al. | |
| 5,475,740 A | 12/1995 | Biggs, Jr. et al. | |
| 5,483,582 A | 1/1996 | Pugh et al. | |
| 5,485,512 A | 1/1996 | Bogart et al. | |
| 5,524,146 A | 6/1996 | Morrisey et al. | |
| 5,561,704 A | 10/1996 | Salimando | |
| 5,583,926 A | 12/1996 | Venier et al. | |
| 5,594,779 A | 1/1997 | Goodman | |
| 5,604,682 A | 2/1997 | McLaughlin et al. | |
| 5,640,443 A | 6/1997 | Kamura | |
| 5,661,787 A | 8/1997 | Pocock | |
| 5,673,306 A | 9/1997 | Amadon et al. | |
| 5,727,057 A | 3/1998 | Emery et al. | |
| 5,752,186 A | 5/1998 | Malackowski et al. | |
| 5,758,286 A | 5/1998 | Leppanen | |
| 5,768,358 A * | 6/1998 | Venier et al. | 379/221.14 |
| 5,778,313 A | 7/1998 | Fougnies | |
| 5,835,861 A | 11/1998 | Whiteside | |
| 5,867,780 A | 2/1999 | Malackowski et al. | |
| 5,898,918 A | 4/1999 | Leppanen | |
| 6,154,648 A * | 11/2000 | Comer | 455/426.1 |
| 6,397,057 B1 | 5/2002 | Malackowski et al. | |
| 6,411,803 B1 | 6/2002 | Malackowski et al. | |
| 6,839,556 B2 | 1/2005 | Malackowski et al. | |
| 7,181,200 B2 | 2/2007 | Malackowski et al. | |
| 7,813,716 B2 | 10/2010 | Malackowski et al. | |
| 8,041,341 B1 * | 10/2011 | Malackowski et al. | 455/411 |
| 2003/0195000 A1 | 10/2003 | Rodriguez | |
| 2004/0005874 A1 | 1/2004 | Malackowski et al. | |

OTHER PUBLICATIONS

Non-Final Office action dated Apr. 17, 2006 regarding U.S. Appl. No. 10/453,452, 20 pages.

Final Office action dated Sep. 14, 2006, regarding U.S. Appl. No. 10/453,452, 21 pages Final Office action dated Jun. 8, 2009 regarding U.S. Appl. No. 10/989,817, 19 pages.

Final Office action dated Aug. 4, 2008 regarding U.S. Appl. No. 10/989,817, 17 pages.

Non-Final Office action dated Dec. 21, 2007 regarding U.S. Appl. No. 10/989,817, 16 pages.

Non-Final Office action dated Jan. 9, 2009 regarding U.S. Appl. No. 10/989,817, 16 pages.

Final Office action dated Jun. 25, 1997 regarding U.S. Appl. No. 08/475,800, 10 pages.

Final Office action dated Mar. 4, 2004 regarding U.S. Appl. No. 10/104,867, 6 pages.

Non-Final Office action dated Jul. 3, 2001 regarding U.S. Appl. No. 09/420,034, 14 pages.

Final Office action dated May 25, 2001 regarding U.S. Appl. No. 08/998,183, 16 pages.

Notice of Allowance dated Jun. 8, 2010 regarding U.S. Appl. No. 10/989,817, 5 pages.

Non-Final Office action dated Jan. 7, 2011 regarding U.S. Appl. No. 12/871,154, 12 pages.

Notice of Allowance dated Jul. 12, 2011 regarding U.S. Appl. No. 12/871,154, 8 pages.

BellSouth Cellular News, vol. II, No. 6, Mar. 19, 1993, 3 pages.

Bob Silver, U S West Cellular, SureFind Classifieds Team Up to Offer Fast, Powerful Service to Cellular Customers, Business Wire, Sep. 24, 2992, Sec. 1, p. 1, New York, NY. 2 pages.

* cited by examiner

SYSTEM OF PROVIDING INFORMATION TO A TELEPHONY SUBSCRIBER

RELATED APPLICATIONS

This application is a continuation of application Ser. No. 12/871,154, filed Aug. 30, 2010 (now U.S. Pat. No. 8,041,341), which is a continuation of application Ser. No. 10/989,817 filed on Nov. 16, 2004 (now U.S. Pat. No. 7,813,716), which is a continuation of application Ser. No. 10/984,166 filed on Nov. 9, 2004 (now U.S. Pat. No. 7,181,200), which is a continuation of application Ser. No. 10/453,452 filed on Jun. 3, 2003; application Ser. No. 10/453,452 is a continuation of application Ser. No. 10/104,867 (now U.S. Pat. No. 6,839,556) filed on Mar. 22, 2002, which is a continuation of application Ser. No. 08/998,183 filed on Dec. 24, 1997 (now U.S. Pat. No. 6,397,057), and is a continuation of application Ser. No. 10/104,197 (now abandoned), which is a continuation-in-part of application Ser. No. 08/998,183 filed on Dec. 24, 1997 (now U.S. Pat. No. 6,397,057); application Ser. No. 08/998,183 (now U.S. Pat. No. 6,397,057) is a continuation of application Ser. No. 08/475,800 filed on Jun. 7, 1995 (now U.S. Pat. No. 5,752,186); all of which are hereby incorporated by reference in their entirety.

FIELD OF THE INVENTION

The invention relates to a system and method for a caller to obtain various levels of fulfillment, research, two way communication, or other services utilizing wireless communication products. One or a plurality of wireless or cellular telephone users connect via cellular service or other wireless service providers to a central or regional messaging and fulfillment center.

BACKGROUND

Wireless communication technology provides accessibility of communications for callers from virtually any location. While radio has provided a wireless medium for delivery of advertising messages for decades, the radio medium has limitations for advertisers based upon the cost of on-air time and programming schedules. Road signage has clear space limitations coupled with minimal "viewing" periods during which a prospective customer is exposed to the message.

Since many prospective customers now travel regularly with wireless telephone equipment at the disposal, it may be advantageous to provide advertising services via wireless telephone linking. From a marketing perspective, a system for wireless telephone delivery of advertising messages is ideally one in which the prospective customer initiates the call, thereby eliminating the time and cost expenditures related to "cold-call" advertising delivery services of the past. In addition, the call should be free to the prospective customer and the system should be equipped to modify existing billing procedures in order to shift the cost of the advertiser.

U.S. Pat. No. 5,131,020 of Liebesny, et al. discloses a method for providing traffic updates to cellular telephone customers within a regional calling area. User input of a code representing the traffic zone of interest to the user automatically connects to either a live operator or a taped message including the requested traffic information. While the Liebesny method does deliver user-requested information via cellular linking, its delivery is local and the messages fixed in scope.

U.S. Pat. No. 5,214,793 of Conway, et al. provides a system for automatically delivering advertising, traffic status, directions, or other information to motorists having microwave transmitter/receiver systems at their respective locations. The requirement that the Conway user have the microwave equipment clearly limits the prospective audience and transmission delivery capabilities of such a system.

U.S. Pat. No. 5,216,703 of Roy provides a cellular switching system whereby indicia dialed by the user after a cellular star (*) number is unique to a specific third party advertiser (TPA) and is used to direct the user's call through a special trunk in the switching system in order to deliver the TPA's message to the user. The Roy system utilizes cellular technology to enter into a trunked system, but is clearly limited in its ability to provide switching through an extensive network of advertisers and providers.

SUMMARY

A system provides information and includes a wireless switch to receive at least one communication transmitted from a wireless telecommunications transmitting and receiving device, the at least one communication comprising a specialized access code, a user identification, and information beyond user identification, wherein the specialized access code has fewer characters than an ordinary telephone number and comprises a non-alphabetic/non-numeric character as a first character. The wireless switch determines a destination for directing information from the at least one communication based upon the specialized access code, the information from the at least one communication comprising the user identification and information beyond user identification. The system also includes a fulfillment center comprising at least one computer to receive the information from the communication at the destination and provide relevant information as a function, at least in part, of the user identification and information beyond user identification, as designated by the specialized access code, for receipt by the wireless telecommunications transmitting and receiving device.

A system provides information for receipt by a wireless telecommunications transmitting and receiving device and includes a switch of a wireless network to receive at least one communication transmitted from the wireless telecommunications transmitting and receiving device via the wireless network, the at least one communication comprising an access code, a user identification, and information beyond user identification, wherein the access code has a fewer number of characters than an ordinary telephone number and comprises a non-alphabetic/non-numeric character as a first character. The switch determines a destination for directing information from the at least one communication based upon the access code, the information from the at least one communication comprising the user identification and the information beyond user identification. The system also includes a fulfillment center at the destination comprising at least one computer to receive the user identification and the information beyond user identification and provide targeted information as a function, at least in part, of the user identification and the information beyond user identification for receipt by the wireless telecommunications transmitting and receiving device.

A system provides information for receipt by a wireless telecommunications transmitting and receiving device and includes a wireless switch to receive at least one communication transmitted from the wireless telecommunications transmitting and receiving device, the at least one communication comprising a specialized access code, a user identification, and information other than user identification, wherein the specialized access code has a fewer number of characters than an ordinary telephone number and comprises a non-alphabetic/non-numeric character as a first character. The wireless switch determines a destination for directing information from the at least one communication, the information from the at least one communication comprising the user identification and the information other than user identification. The system also includes a fulfillment center at the destination comprising at least one computer to receive the information from the at least one communication and provide relevant information as a function, at least in part, of the user identification and information other than user identification for receipt by the wireless telecommunications transmitting and receiving device.

A system provides information for a user and includes a fulfillment center comprising at least one computer to receive information from at least one communication transmitted via a wireless network from a wireless telecommunications transmitting and receiving device with the specialized access code, the information from the at least one communication comprising a user identification and information beyond user identification, wherein the specialized access code has fewer characters than an ordinary telephone number and comprises a non-alphabetic/non-numeric character as a first character. The fulfillment center computer provides relevant information as a function, at least in part, of the user identification and information beyond user identification for receipt by the wireless telecommunications transmitting and receiving device via the wireless network.

A method for providing information includes receiving at least one communication transmitted from a wireless telecommunications transmitting and receiving device via a wireless network, the at least one communication comprising a specialized access code, a user identification, and information beyond user identification, wherein the specialized access code has fewer characters than an ordinary telephone number and comprises a non-alphabetic/non-numeric character as a first character. A destination is determined for directing information from the at least one communication, the information from the at least one communication comprising the user identification and information beyond user identification. The information from the at least one communication is received at at least one fulfillment center computer at the destination. The fulfillment center computer provides relevant information as a function of, at least in part, the user identification and information beyond user identification for receipt by the wireless telecommunications transmitting and receiving device.

A method for providing information for receipt by a wireless telecommunications transmitting and receiving device includes receiving at least one communication transmitted from the wireless telecommunications transmitting and receiving device at a switch, the at least one communication comprising an access code, a user identification, and information beyond user identification, wherein the access code has a fewer number of characters than an ordinary telephone number and comprises a non-alphabetic/non-numeric character as a first character. A destination is determined for directing information from the at least one communication, the information from the at least one communication comprising the user identification and the information beyond user identification. The user identification and the information beyond user identification is received at at least one fulfillment center computer at the destination. Targeted information is provided by the fulfillment center computer as a function, at least in part, of the user identification and the information beyond user identification for receipt by the wireless telecommunications transmitting and receiving device.

A method for providing information for receipt by a wireless telecommunications transmitting and receiving device includes receiving at least one communication transmitted via a wireless network from the wireless telecommunications transmitting and receiving device, the at least one communication comprising a specialized access code, information regarding a user, and information other than user identification, wherein the specialized access code has a fewer number of characters than an ordinary telephone number and comprising a non-alphabetic/non-numeric character as a first character. A destination is determined for directing information from the at least one communication, the information from the at least one communication comprising the information regarding the user and the information other than user identification. The information from the at least one communication is received at at least one fulfillment center computer. Relevant information is provided by the fulfillment center computer as a function, at least in part, of the information regarding the user and information other than user identification for receipt by the wireless telecommunications transmitting and receiving device.

A method for providing information for a user includes receiving, at at least one fulfillment center computer, information from at least one communication transmitted from a wireless telecommunications transmitting and receiving device with the specialized access code via a wireless network, the information from the at least one communication comprising a user identification and information beyond user identification, wherein the specialized access code has fewer characters than an ordinary telephone number and comprises a non-alphabetic/non-numeric character as a first character. Relevant information is provided by the fulfillment center computer as a function, at least in part, of the user identification and information beyond user identification for receipt by the wireless telecommunications transmitting and receiving device.

A system provides service to a user. The system includes a fulfillment center comprising at least one computer to receive at least one communication comprising a specialized access code dialed from a wireless telecommunications transmitting and receiving device, information regarding the user, and information other than user identification, the specialized access code having a fewer number of characters than an ordinary telephone number and comprising at least one non-alphabetic/non-numeric character as a first character. At least one service is delivered to the wireless telecommunications transmitting and receiving device based at least in part on the information regarding the user and the information other than user identification.

A system provides information for a user. The system includes a fulfillment center comprising at least one computer to receive, via a wireless network, information from at least one communication transmitted from a wireless telecommunications transmitting and receiving device with the specialized access code, the information from the at least one communication comprising a user identification and information other than user identification, wherein the specialized access code has fewer characters than an ordinary telephone number and comprises a non-alphabetic/non-numeric character as a first character. Relevant information is provided as a function, at least in part, of the user identification and information other than user identification for receipt by the wireless telecommunications transmitting and receiving device.

A system provides information for a user. The system includes a fulfillment center comprising at least one computer to receive information from at least one communication transmitted via a wireless network from a wireless telecommunications transmitting and receiving device with the specialized access code, the information from the at least one communication comprising information regarding the user and information other than user identification, wherein the specialized access code has fewer characters than an ordinary telephone number and comprises a non-alphabetic/non-numeric character as a first character. Relevant information is provided as a function, at least in part, of the information regarding the user and information other than user identification for receipt by the wireless telecommunications transmitting and receiving device via the wireless network.

A method provides information for receipt by a wireless telecommunications transmitting and receiving device. The method comprises receiving at least one communication transmitted from the wireless telecommunications transmitting and receiving device, the at least one communication comprising an access code, a user identification, and information other than user identification, wherein the access code has a fewer number of characters than an ordinary telephone number and comprises a non-alphabetic/non-numeric character as a first character. The method further includes determining a destination for directing information from the at least one communication, the information from the at least one communication comprising the user identification and the information other than user identification. The method further includes receiving the user identification and the information beyond user identification at at least one fulfillment center computer at the destination and providing targeted information by the fulfillment center computer as a function, at least in part, of the user identification and the information beyond user identification for receipt by the wireless telecommunications transmitting and receiving device.

A method provides information for a user. The method includes receiving, at at least one fulfillment center computer, information from at least one communication transmitted from a wireless telecommunications transmitting and receiving device with the specialized access code via a wireless network, the information from the at least one communication comprising information regarding the user and information beyond user identification, wherein the specialized access code has fewer characters than an ordinary telephone number and comprises a non-alphabetic/non-numeric character as a first character. Relevant information is provided by the fulfillment center computer as a function, at least in part, of the information regarding the user and information beyond user identification for receipt by the telecommunications transmitting and receiving device.

A method for providing information for a user comprises receiving, at at least one fulfillment center computer at a destination corresponding to a specialized access code, information from at least one communication transmitted from a wireless telecommunications transmitting and receiving device with the specialized access code via a wireless network. The information from the at least one communication comprises a user identification and information beyond user identification, wherein the specialized access code has fewer characters than an ordinary telephone number and comprises a non-alphabetic/non-numeric character as a first character. Relevant information is provided by the fulfillment center computer as a function, at least in part, of the user identification and information beyond user identification for receipt by the wireless telecommunications transmitting and receiving device.

DETAILED DESCRIPTION

Figure 1:
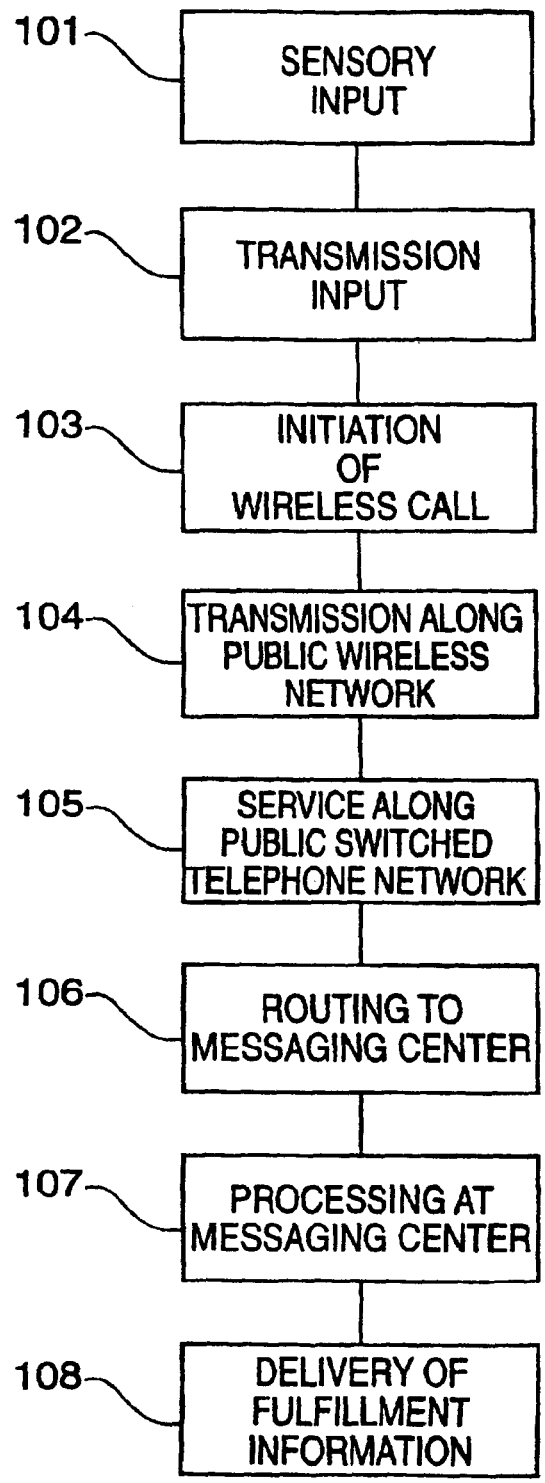
FIG. 1 provides an overview block diagram in accordance with an embodiment of the inventive system.

In detailing the subject invention, several industry-recognized definitions and newly-coined terms will be used throughout the description. In order to facilitate an understanding of the invention, the following glossary of terms is provided:

Access Code: Abbreviated dialing code to access the system such as "*500".

Advertiser Identifier: Secondary code used to select target advertiser. Also referred to as "advertiser extension."

ANI: Automatic Number Identification. Commonly referred to as a ten digit telephone number.

CDMA: Code Division Multiple Access

CO: Central Office

DNIS: Dialed Number Identification Service

ISDN: Integrated Services Digital Network

IVHS: Intelligent Vehicle Highway System

LEC: Local Exchange Carrier

MTSO: Mobile Telephone Switching Office

N-AMPS: Narrow band AMPS

NPA NXX: The first six digits of the ANI representing the Number Plan Area (Area Code) and Local Exchange.

PCS: Personal Communications System

POTS: Plain Old Telephone System

PSTN: Public Switch Telephone Network

PWN: Public Wireless Network

SDN: Software Defined Network

Target Location: Final destination of the wireless call for fulfillment.

TDMA: Time Division Multiple Access

Pursuant to one embodiment, a prospect driving past an outdoor signboard will observe the advertiser's message, which will include a call-to-action, for example "CALL *500" or selected other abbreviated access code using the driver's cellular phone. In another embodiment, a prospect driving and listening to a radio broadcast will be prompted to dial *4AD (for example) by trailers to commercials. In a third embodiment, drivers passing highway interchanges with informational gas, food, and lodging signage will also be prompted to "CALL *522", for example. Other uses may involve prompts located on buses, on board commuter trains, in public stadiums, etc.

Following the general direction to dial the access code, each individual commercial spot will contain a one or more digit identifying alphanumeric code known as the Advertiser Identifier. Hence, a typical outdoor signboard will contain the following:

1 CALL *500 SEND 1234 No Airtime Charges

The prospect, held captive in his or her car, perhaps sitting in rush-hour traffic, will utilize their cellular phone to seek out additional information on the advertised product or service. In the case of the highway interchange, the prospect can obtain detailed information of the products or services (e.g. shopping, food, lodging, gas, etc.) available within three to five minutes of that particular interchange.

In one embodiment, once prospects call *500 or other designated access code, they will hear a short message welcoming them to the system and prompting them to either dial or speak a one or more digit identifier, for example the name of the advertiser or a product name. After dialing or speaking an identifier, the customer will enter either an automated messaging system or be greeted by a live operator. Due to the inherent limitations of outdoor and radio advertising in terms of communicating a detailed message of product and service benefits, the additional level of transmitted information will have a high perceived value to both the advertiser and the primary media company.

Based upon the particular services contracted, prospects can be provided with a menu of additional customer services including: the mailing of product/service information to their home or business; an audio listing of local retailers and their addresses or telephone numbers (with directions under certain circumstances); direct product sales; couponing; sampling; sweepstakes entry; polling; optional transfer to a retailer; optional transfer to the advertiser's customer service number; optional transfer to the advertiser's mail order desk; or, an opportunity to participate in a brief survey (for which the prospect may receive some nominal compensation or award).

Advanced interconnection and caller location can be achieved via the Public Wireless Network (PWN) using the Integrated Services Digital Network (ISDN), Dialed Number Identification Service (DNIS), or the intelligent network.

FIG. 1 provides a process overview. There are essentially four distinct basic functions which comprise the process flow, the details of which are discussed below. These elements are (1) the call initiation at 103, the detailed process flow for which is provided in FIG. 4; (2) switching or other elements of the PWN at 104, as further detailed in FIG. 6; (3) transfer of the call over the PSTN at 105, as further detailed in FIGS. 8 and 9; and (4) control over fulfillment and feedback to the user, as detailed in FIG. 10.

The call initiation function is generally outlines as boxes 101-103. At box 101, the prospect receives the sensory input which prompts use of the system, either via road signage, an audio message from the radio, etc. Upon manual input to a telephone, at 102, the prospect (hereinafter referred to as the "caller") calls in to obtain the information suggested by the sensory input. Box 103 refers to the initiation of the wireless call from the system perspective, as opposed to the caller input and transmission from the caller's telephone. As an alternative to the caller manually placing the telephone call, the call may be initiated by automatic processing, as will be discussed below with reference to FIG. 4. Box 103 initiation of the wireless call by the system results from either a third party remote triggered signal or a local independent transmitting signal and includes the mobile identification number and the electronic component's serial number for subsequent access and billing verification.

Subsequent to system initiation of the wireless call, the call is transmitted along the Public Wireless Network (PWN) at 104, for caller identification, billing verification and/or modification, and routing to the PSTN, as is further detailed below. Thereafter, service is provided along the PSTN at 105 and the call is ultimately provided for routing to the messaging center at 106 and thence handled at the gateway to the target fulfillment center, at 107. Clearly, it may be possible to route the call and connect to the target center using only the wireless network, particularly for communications between geographically local callers and target locations. However, accessing the PSTN provides greater transmission reliability and increased geographical distribution of prompting media and fulfillment centers to realize a national system.

Figure 2:
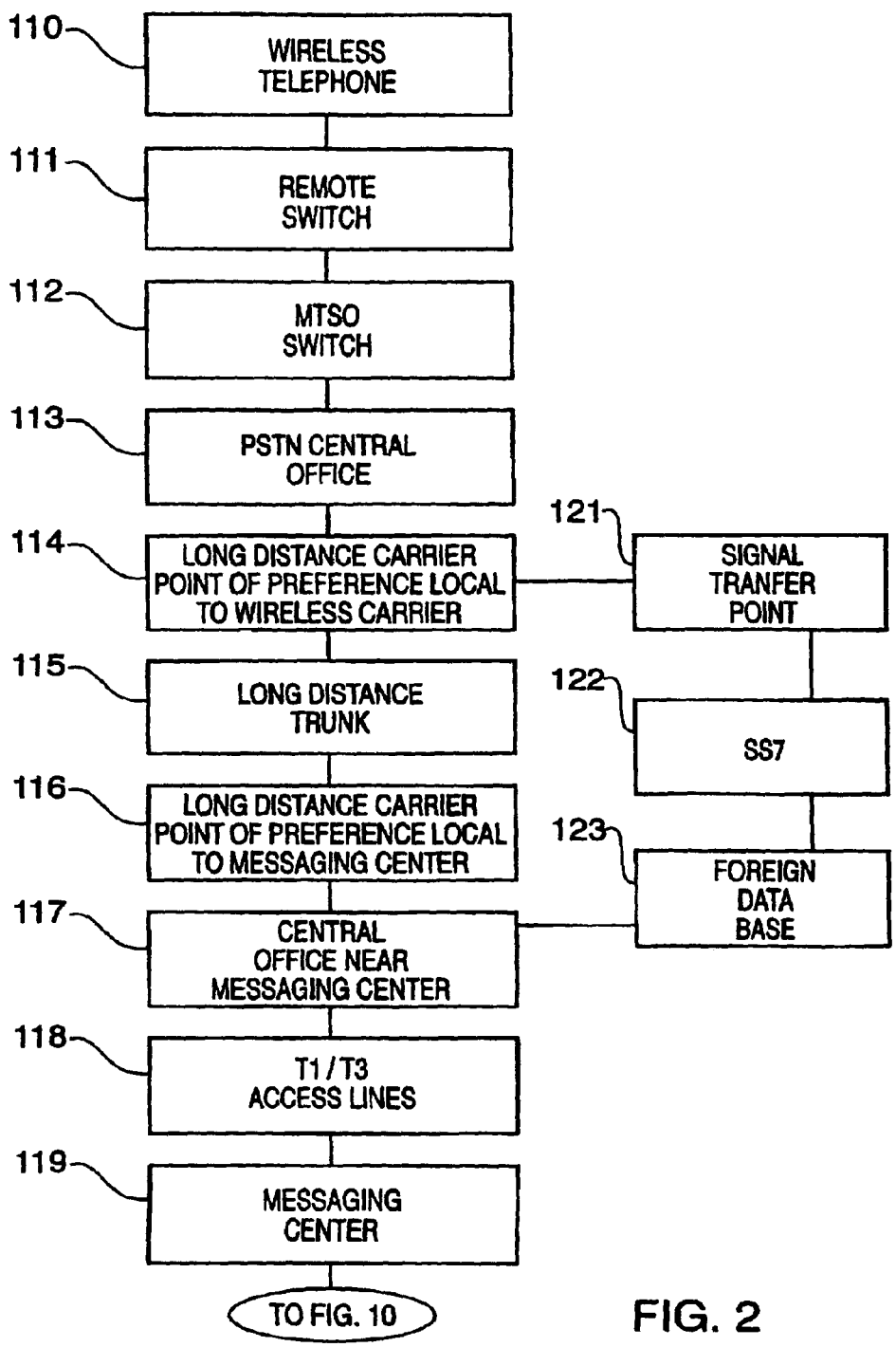
FIG. 2 details call routing in accordance with an embodiment of the present invention.

FIG. 2 provides a more detailed description of the path of a call through the inventive system. From the wireless telephone, 110 of the block diagram, the call is sent with the caller input access code, which is an abbreviated dialing code to access the system, such as *500. In accordance with prior art wireless telephone service, the call is communicated to a base station remote switch, 111, at which a base station controller relays the call to the MTSO or other wireless service switch 112, as appropriate.

Central to the operation of the inventive system is the functioning of wireless switch 112. This switch must recognize the caller seeking to utilize the system and must recognize the access code and compare it to entries in a database of approved codes. The switch 112 also performs recognition on the subscriber identity and the subscriber location, and determines the billing status for the caller as either a local system user or a roaming user (billing detail is provided in FIGS. 7 and 11). Depending upon the billing status determination (i.e., local or roaming), software or firmware at the switch is utilized to modify established billing procedures and to create a new billing record for the third party provider of the service under a preset billing arrangement. Alternatively, if the system determines that the caller is roaming and the caller's service provider has not arranged to allow treatment of the call as local, the system queries the caller if the caller will agree to be billed for all airtime charges. Absent caller acceptance of billing responsibility, access to the system is blocked. Examples of switches which can be adapted to perform the foregoing functionality include AT&T's System 85 5E Diffinity Generic 2.

Assuming favorable determinations with respect to verification of the input access code, of subscriber identity, and of caller billing, switch 112 converts the access code to a land line 800-number and routes the call to the PSTN's central office, illustrated as block 113. The central office of the PSTN accepts the call and recognizes it as belonging to the system described by preassigned POTS numbers and, if necessary, translates the land line 800-number to a Routing Telephone Number (i.e., the POTS number). Typically, the preassigned POTS numbers will be traditional 800 service numbers. Such service is exemplified by AT&T's MEGACOM 800 Service with a Customer Specific Term Plan II (CSTP II). Typically, such service will also utilize on-line call detail data software to collect information about the system calls such as connect time, the 800 number sent by the wireless carrier, call disposition, date and time of call, call duration, and the ANI of the caller. Such service is generally described as a high capacity digital, direct access, virtual banded, inbound calling service, and requires a dedicated connection between the serving central office and the target location, as is known to one having familiarity in the art. Depending upon the access code, and the nature of the fulfillment of a call bearing that access code, the call may be routed along one of several call completion paths at the PSTN, as further detailed in FIG. 3.

Call completion involves selecting the long distance carrier of choice and routing the call to this carrier's Point of Preference at 114 via the selected Routing Telephone Number. This procedure is implemented using either a conventional in-band Dual Tone Multi-Frequency (DTMF) system or by packetizing the digits and processing them via a Signaling Transfer Point (STP) 121 into the Signaling System 7 common channel signaling network 122. If the Point of Preference is local to the messaging center, the connection is made, via Long Distance Trunk 115 using the dedicated 800-number, to the local Point of Preference and thence to the target location messaging center 119 using T1.5 or T3 access lines 118.

When the carrier Point of Preference is not local to the messaging center, the call is routed via the network to a Signal Transfer Point 121 (also referred to as a Signal Control Point, SCP) or other network node that contains databases that support Cellular Linking services. Thus, from the Foreign Data Base at 123, access is made to the Central Office 117 and ultimately to the Messaging Center 119.

By means of an Integrated Voice Response (IVR), the mobile wireless subscriber is thus able to obtain information and/or fulfillment services. Subsequent to initial call dialing the mobile subscriber inputs information on the geographic location of the mobile terminal involved in the call, or alternatively inputs location information received from one or more of a variety of media including, but not limited to, contacts with other cellular subscribers, broadcast radio, especially programs dealing with traffic conditions or similar events, global positioning systems, intelligent highway systems, roadside signs displaying city boundaries and street names, personal observation, information from other passengers, etc.

Electronic positioning data from consumer equipment within the car may be converted into DTMF tones and coupled to the mobile wireless terminal for automatic transmission over the cellular network. Location data that does not form part of the inherent capabilities of the cellular system and is not available in electronic form will be input to the wireless terminal as additional dialed digits that will be requested by the IVR system established by Cellular Linking at the informational and fulfillment database.

The location of the mobile wireless terminal will be computed by a processor and special software permits a display of the cellular service area containing the terminal to be cross referenced against positional data input by the customer as dialed digits. Location information obtained in this manner is used to more readily fulfill the Cellular Linking customer's needs for the services requested from Cellular Linking's third party service providers.

Certain new kinds of digital cellular systems, such as GSM and other TDMA and CDMA systems, and PCS networks may have the ability to process special numbers, identify subscribers including roamers, authorize alternative billing procedures, and identify mobile terminal locations more readily than conventional AMPS and NAMPS systems. In such cases, special location processing software that forms an inherent part of the mobile switching system will determine the location of the mobile wireless terminal, transmitting this information along with other necessary data to the Cellular Linking central database.

Figure 3:
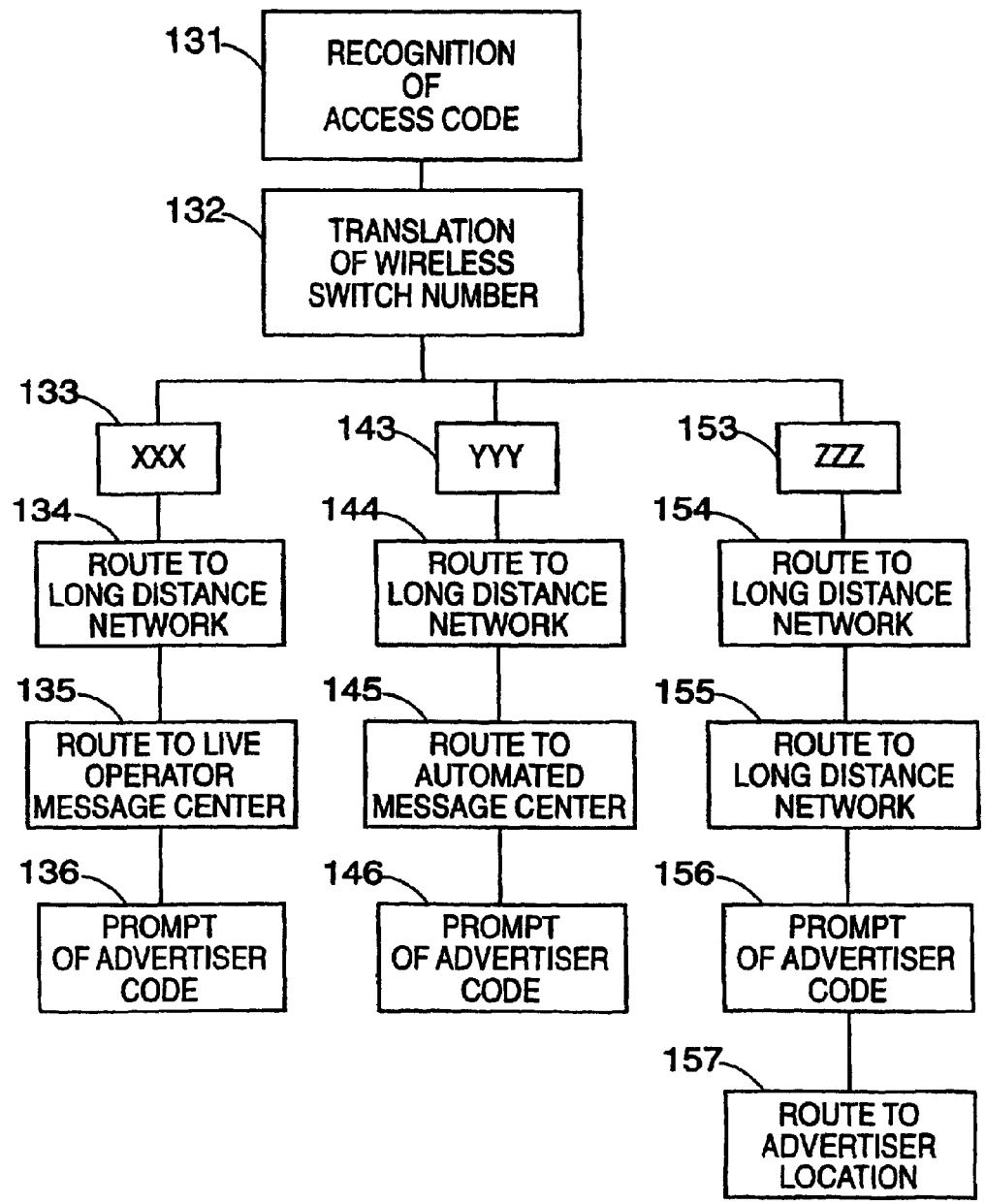
FIG. 3 illustrates access code routing in accordance with an embodiment of the present invention.

FIG. 3 describes three alternative call path routings based upon the specific access code dialed by the user. Upon recognition of the access code at 131, as conducted at the MTSO or other wireless service switch, wireless switch translation is conducted at 132. Since access codes are assigned based upon the type of fulfillment service, different categories of access codes will be automatically routed at switch 112. As shown in FIG. 3, three representative call routing paths may be automatically selected, though it may be possible to integrate many more than three possible paths into a wide-scale system.

In accordance with the representative routing plan, an access code */# X-X-X, 133, denotes routing via the PSTN, at 134, to a live operator, at 135, and prompting, at 136, of the advertiser identifier at the target location. Given an access code */# Y-Y-Y at 143, routing proceeds via the PSTN at 144 to an audiotex service bureau, at 145, and prompting of the advertiser identifier at the target location at 146. Finally, access code */# Z-Z-Z at 153 denotes routing to the PSTN at 154 and 155 and prompting of the advertiser identifier within the PSTN at 156 with subsequent direction of the call to the target location which may be an advertiser's premise at 157.

The use of the above described call path routings allows for minimal access codes to be required by the system and provides for cost efficiency to the system by routing a majority of calls without prompting of the advertiser code within the PSTN.

Figure 4:
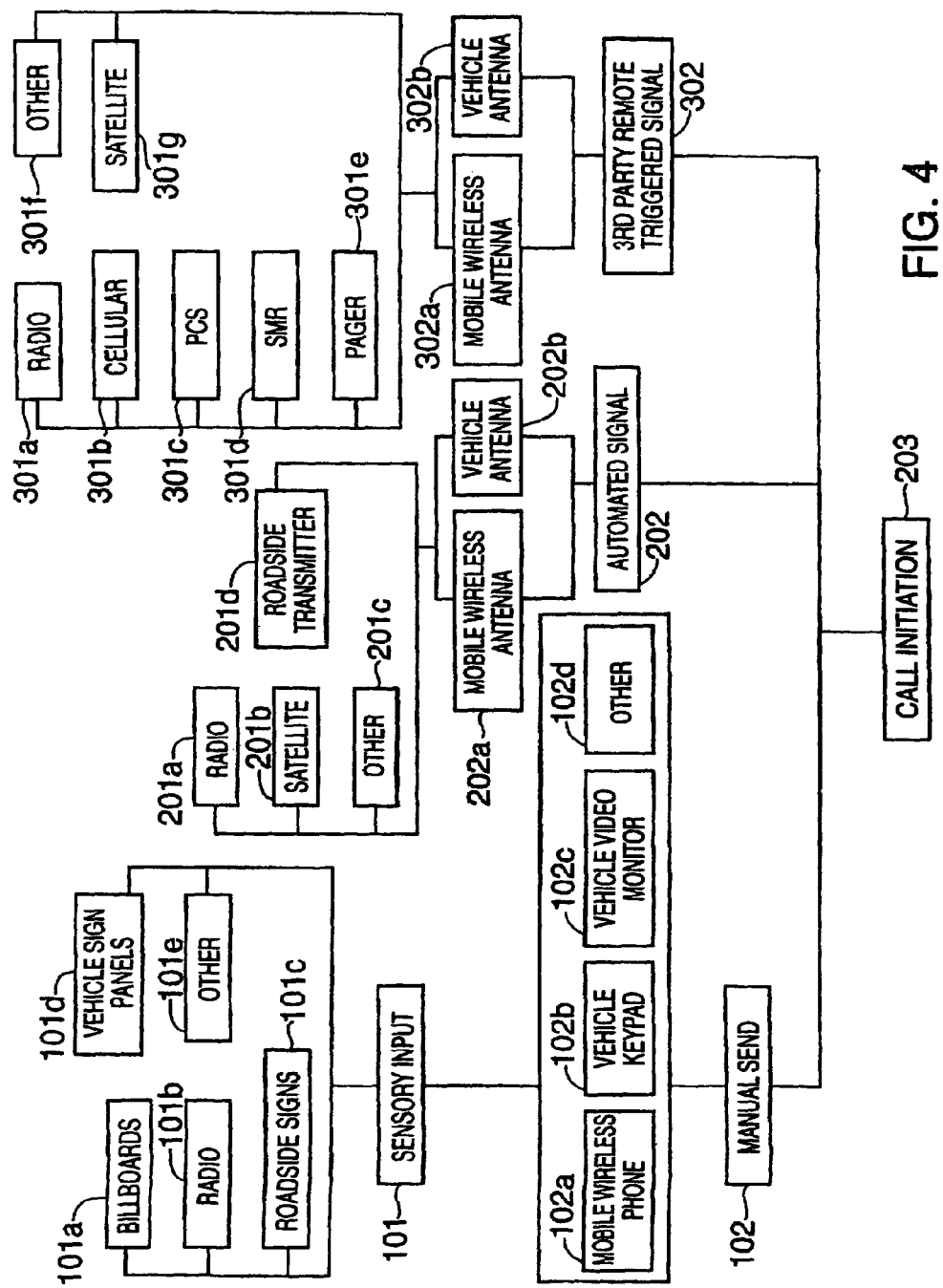
FIG. 4 provides a block diagram detailing elements related to call initiation in one embodiment of the invention.

FIG. 4 describes the initiation of the wireless call, into FIG. 1, box 103, using manual or automated means. Note the following means for call initiation:

(a) Sensory input 101 and manual initiation 102: as shown in FIG. 1, the mobile subscriber receives a sensory input from any of a variety of physical and electronic promotional and/or advertising media, 101a through 101e, including, but not limited to, pagers, cellular calls, broadcast radio, billboards, roadside signs, printed media, vehicle sign panels, or other means. Upon receipt of the sensory input at 101, the caller manually conducts the telephone call at one of the input modules 102a through 102d.

(b) Automated signal initiation is triggered through the mobile wireless antenna or a vehicle antenna, 202a or 202b, upon receipt or input from any of the components 201a through 201d which can communicate with the antennas. Such signal to be originally generated by AM or FM radio transmitters, satellite feed, roadside low power transmitters, or other means triggers the automated signal at 202.

(c) Third party remote triggered signal at 302 and subsequent initiation parallels the automated signal at 202 since such signaling is automatically conducted by the mobile wireless antenna or the vehicle antenna 302a or 302b. The input, though, may be transmitted through further means, 301a through 301g, including cellular or other wireless telephony equipment.

A sensory input that contains any information that encourages the subscriber to utilize the invention may prompt the customer to initiate a wireless call using the keypad of a cellular telephone to dial or speak a set of digits commencing with *, or some other call prefix such as #, utilizing a special code. These digits, along with the command SEND activate the cellular communications system and connect the subscriber by means of a formatted mobile message through a wireless channel via base station firmware over a T1 or other kind of link to the line interface at the MTSO where the call is demodulated and connected to the central processor at the mobile switch. Using the same input media, an advertiser can access the system to update or modify fulfillment data from a remote location using the appropriate (*) or (#) identifier or a POTS wireline.

Figure 5:
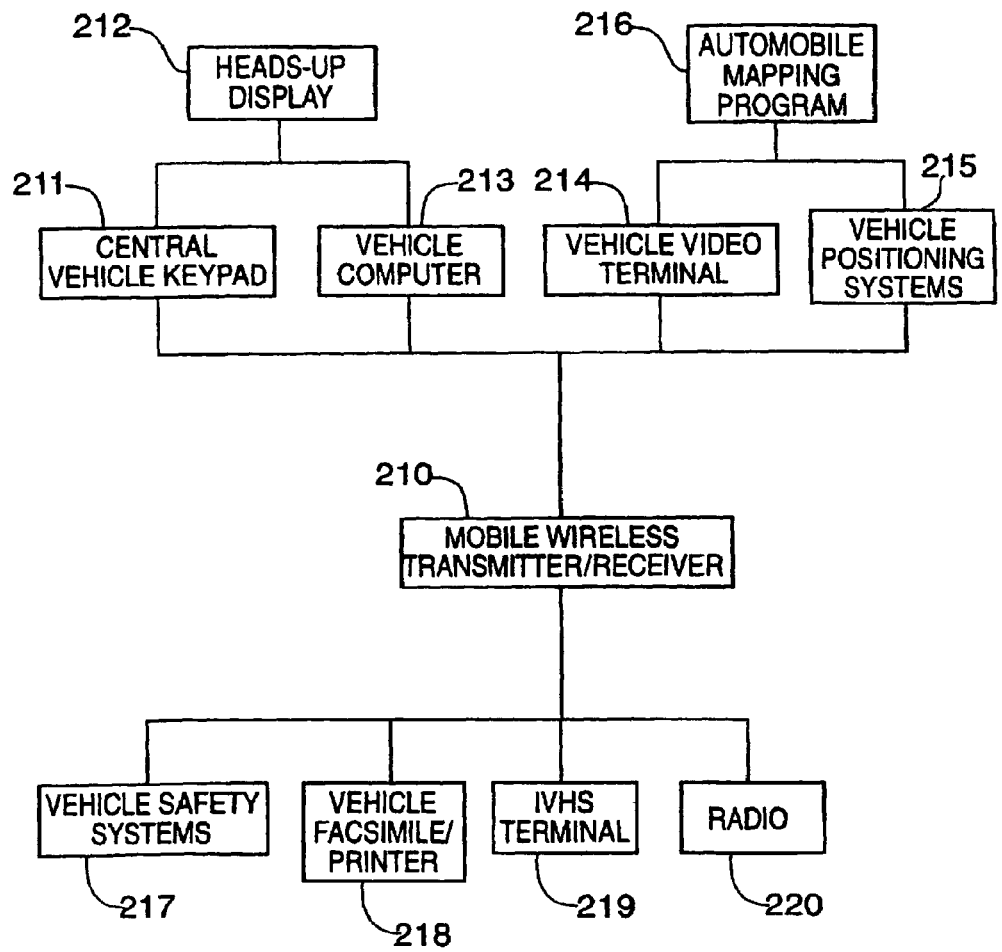
FIG. 5 is a block diagram detailing integration as per an embodiment of the invention.

FIG. 5 describes the integration of the wireless telephone or specifically the mobile wireless transmitter and receiver 210 to a vehicle transporting the caller. The wireless telephone may be connected by a hardwire interface to a vehicle's central key pad 211 located on the steering wheel or other convenient location. Such connection will permit easier use of the invention and will allow for visual confirmation of system functions through the vehicle's heads-up-display capabilities, at 212.

The wireless telephone may also be connected by a hardwire interface to a vehicle's central computer 213 to allow both components to operate more effectively. The wireless telephone may access memory or processing capabilities of the central computer to enhance its function as a communications device. Similarly, the vehicle may access the transmission and reception capabilities of the wireless phone to perform a variety of diagnostic, safety or passenger convenience tasks.

Yet another arrangement provides that the wireless telephone be connected by a hardwire interface to a vehicle's video terminal 214 to allow display of telephony functions or the receipt and display of video messages sent by wireless means to the user. A hardware connection can also be made to a vehicle's positioning system 215, such as GPS, and automobile mapping system 216 in order to facilitate communication of position data or to allow advertisers to transmit data containing directions or location-related information. Integration of the wireless telephone 210 to the vehicle's safety system 217 provides for automated transmission of emergency messages. When coupled with the vehicle positioning system 215, such emergency messages may contain the specific location of the troubled vehicle or user. Vehicle location data is often valuable for both caller purposes (e.g., emergencies) and cellular system efficiencies, as evidenced by the systems disclosed in U.S. Pat. Nos. 5,327,144 and 5,343,493. Cellular location can be determined by one or more of the following means:

A. Identification of the MTSO which routes the call to the PSTN;

B. Identification of the cell, sub-cell, or microcell from which the call was placed or is currently being serviced;

C. The use of the intelligent network such as ISDN or DNIS information;

D. The signal strength of the call;

E. The call history;

F. Alternative visual identification; or

G. Vehicle based locations systems.

The caller's location may be determined by identifying the subscriber's position within the cell by one or more of the following techniques:

(A) To cell level by identifying the base station taking part in the transmission; to sub-cell level subsequent to a hand-off when further data becomes available as to the location of the mobile subscriber.

(B) To sub-cell level for small cells from signal strength and azimuthal data at the directional antenna as follows:

(1) Antenna at cell base station receives signal from subscriber's terminal;

(2) Signal is fed via antenna combiner to radio transceiver module;

(3) Signal is analyzed by radio controller which determines signal strength and azimuth using directional antenna segmentation techniques;

(4) Special software program in controller instructs processor to represent these data in the form of a digital code for modulating a T1 line or other form of communication channel for transmission to MTSO;

(5) MTSO codec demodulates digital signal reproducing original bit stream sent from base station;

(6) Call processing software translates this bit stream into digits recognizable by central;

(7) Processing unit at centralized or regional messaging center;

(8) Software program at center receives digits and compares these with database of signal strength and azimuthal information on specific cell base station;

(9) Special geographical location software package instructs processor to compute comparative data in terms of geographic locale of mobile subscriber.

(C) To cell level for wireless communication systems with very small cells such as PCS;

(D) To cell level where more precise location identification is deemed unnecessary by the third party service provider responding as part of claimed procedures;

(E) To sub-cell level for large cells from directional data collected from non-multipath propagation patterns such as occur in rural and semi-rural service areas;

(F) To sub-cell level by using triangulation data from two or more adjacent base stations;

(G) To sub-cell level by using location updating procedures from previous calling patterns established by that subscriber due to frequent and continued use of the invention; and (H) To sub-cell level from subscriber-input data received from personal observation of external information including but not limited to numerical data displayed on billboards or other visible advertising media, instructions received over broadcast radio channels, information gathered from other visible sources, information received from fellow passengers in the vehicle equipped with the mobile radio terminal; other personal third party sources; information previously provided to the subscriber as part of commercial agreements.

The caller location information can be used to reconnect inadvertently dropped calls. The caller's location or home or office phone number can also be used to identify a local dealer by reference to a computerized vertical-horizontal file, as detailed in U.S. Pat. No. 4,757,267.

Integration of the wireless telephone to the Intelligent Vehicle Highway System (IVHS) 219 will provide enhanced features and further communication abilities utilizing the receiver and transmitter of the wireless phone. The wireless telephone may also be connected by hardwire interface to a vehicle's printer or other mobile facsimile or printer at 218 to allow printed transmissions from advertisers, including coupons, etc. Finally, the wireless telephone may be connected by a hardwire interface to a vehicle's radio 220 to allow audible display of telephony functions or the receipt and display of audio messages sent by other wireless means to the user.

Figure 6:
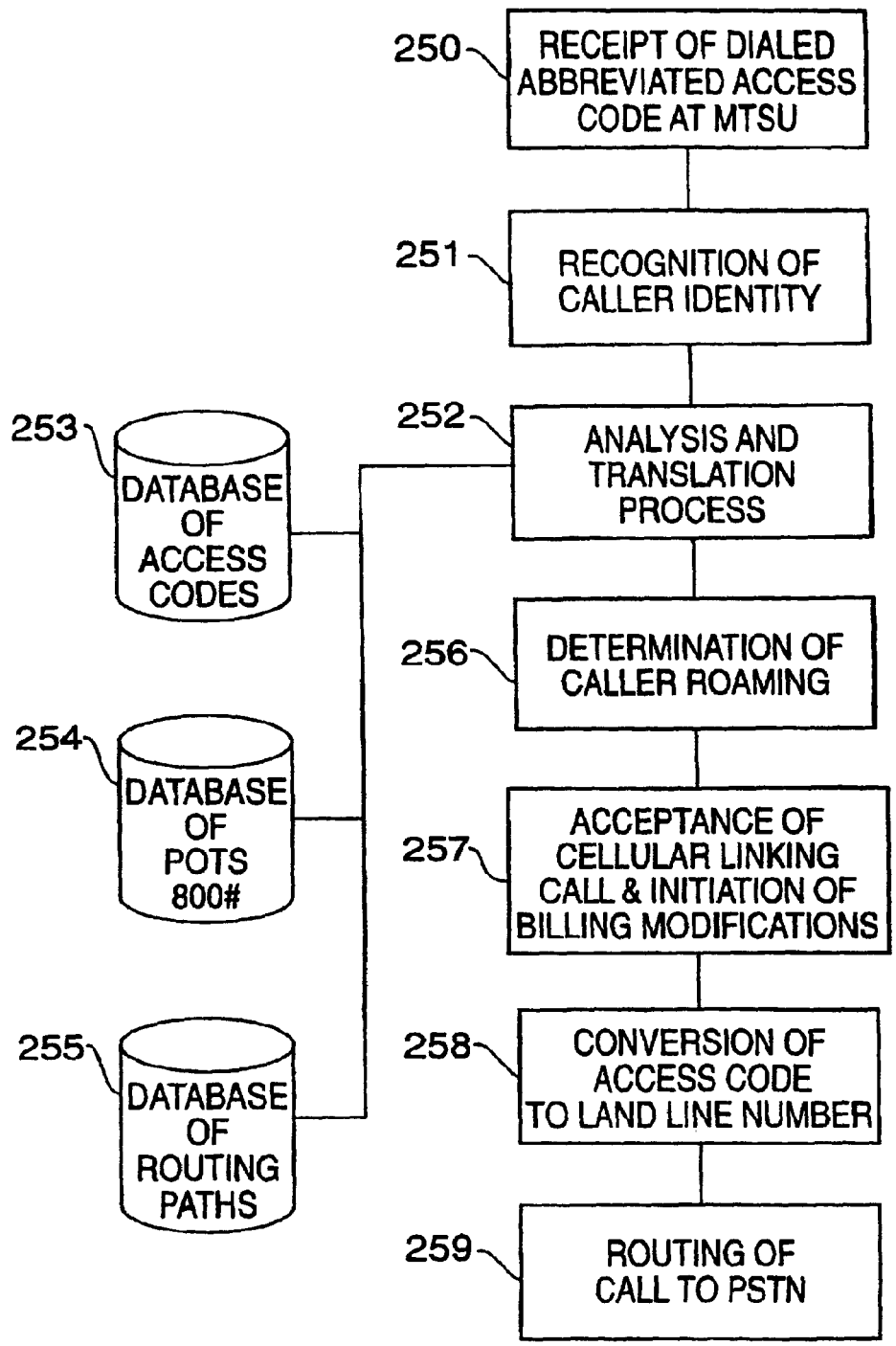
FIG. 6 is a block diagram showing changes to the existing public wireless network (PWN) in accordance with an embodiment of the invention.

FIG. 6 further describes the functions of the MTSO of the PWN in accordance with the present invention. The MTSO comprises the central office computerized equipment that coordinates and controls the routing and completion of calls in a cellular system. The MTSO includes a Central Processor (not shown) for identifying, accepting, and taking action upon receipt of the dialed digits as part of a Cellular Linking call having a special prefix. The central processor functions are detailed at FIG. 6.

At 250, the MTSO receives the abbreviated access code and verifies both the access code and the caller identity at 251. An object of the present invention is the use of relatively few digits as advertiser identifiers to reduce user induced errors in the system and generally increase user friendliness. The MTSO first determines whether the received access code is one which the MTSO recognizes as valid. Assuming validity of the access code, the MTSO next verifies the caller's identity and approved access to the system. One or more of the following identifiers can be verified at the MTSO:

Mobile Identification Number (MIN) or ANI of the wireless telephone; Electronic Serial Number (ESN); International Mobile Station Identifier (IMSI); Mobile Station Type (fixed, automobile, transportable, portable, aircraft); ANI of the MTSO; Source such as Mobile Station (MS), Base Station Controller (BSC), Mobile Switching Center (MSC), Home Location Register (HLR) for fixed mobiles, Selective Router or other sources; Caller Geographic Location (latitude, longitude, altitude, resolution which information is contained in the subscriber's signature only for cellular or other wireless telephone communication systems that have the inherent ability to generate and process such positional data); Billing Number; Subscriber name; Subscriber billing address; Subscriber home telephone number; Subscriber personal telephone number; Subscriber priority indication; Priority Access & Channel Assignment (PACA) level (A, B or C); Preferred language; and, Home wireless service provider information. As will be apparent to one having skill in the art, some of the above-listed information may be automatically appended to the user-input access code by the wireless telephone, depending upon the specific preprogramming thereof.

After caller identification, the user-input access code digits are provided for analysis and translation at 252 by the central processor at the switch where software operates on them and compares them with data received from a number of databases, 253-255. These databases provide data on both calling and called parties and preferred routing through the network and are integral to the call processing procedure, examples of these databases being user files, number tables, access codes and routing tables. The various data are analyzed and, when the dialed digits and other transmitted identifiers are approved, the processor creates a set of translated digits that are returned to the call processing module for additional actions to be taken, such as determination of the caller's local or roaming status at 256, billing procedures at 257, and call routing.

At 257, software within the central processor at the MTSO insures that the mobile subscriber making the Cellular Linking call is not billed for air time, local or long distance call charges, or local and remote charges. In the case of roamers this may be done by creating a pseudo-cellular number for the Cellular Linking provider number for third party billing procedures, or by some other means which will be apparent to one having skill in the art (see: e.g., U.S. Pat. No. 5,216,703). Billing modification, with the object of allowing the MTSO to accept calls it otherwise would not, is further detailed in FIGS. 7 and 11.

Finally, upon successful completion of steps 250-252, 256 and 257, at which time the access code has been recognized, the subscriber identity has been recorded, the presence of roamers has been determined and the necessary roamer billing acceptance procedures have been started, the access code is converted to a landline Cellular Linking number at 258 and the call routing software at the MTSO instructs the central processor to proceed to the next stage of telephone network call completion procedures by routing the call to the PTSN at 259. Connection and transmission may be based on TDMA, CDMA, GSM, SMR, PCS or N-AMPS technology, as would occur to one having familiarity with the subject technology.

If the above process is interrupted at any point after receipt of the mobile subscriber signature, further special software instructs the switch to send a recorded message that prompts the subscriber to redial the complete number sequence. On receipt of the digits, the call validation and call processing procedures are restarted.

Figure 7:
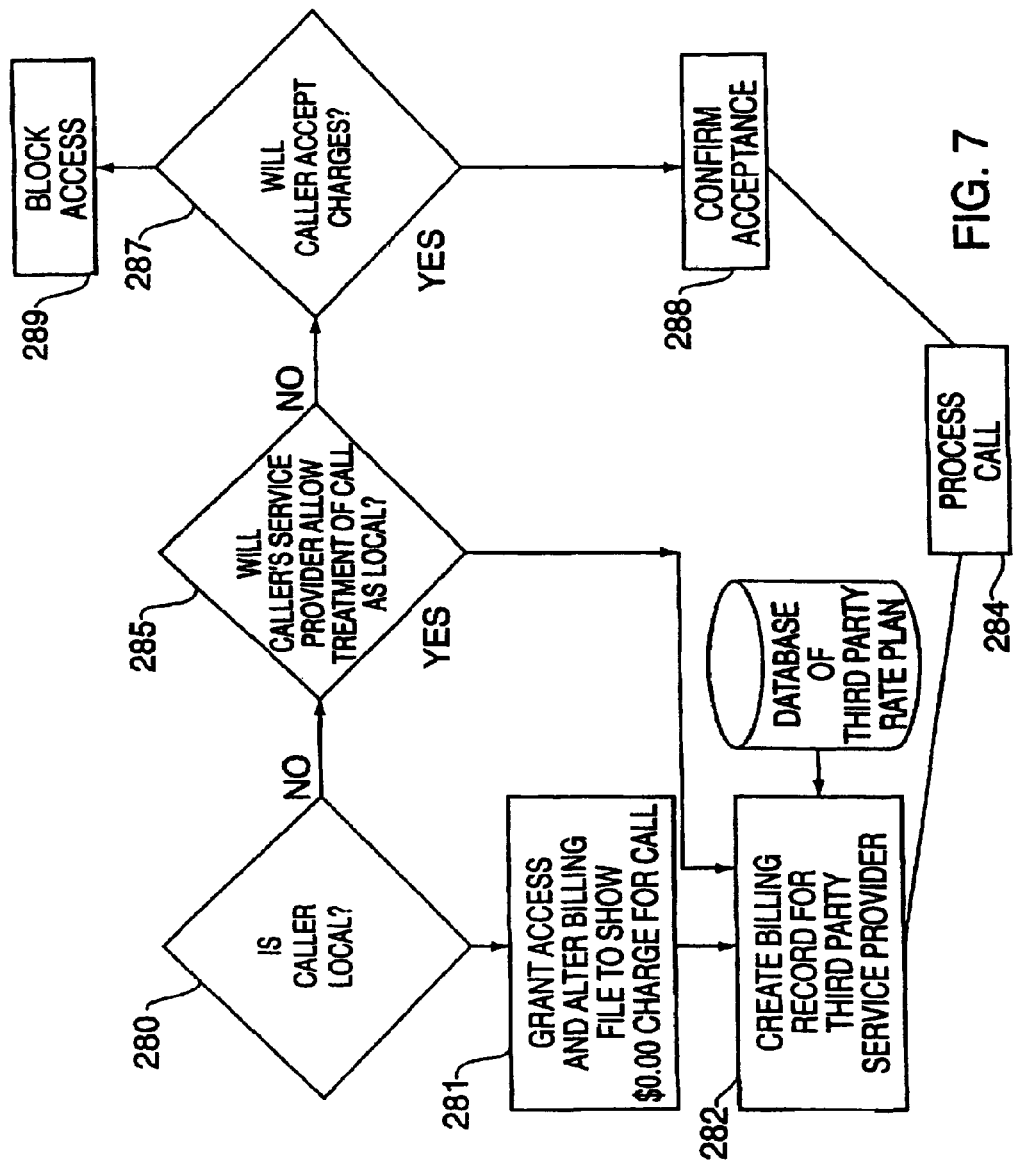
FIG. 7 is a flow diagram showing billing process flow in accordance with an embodiment of the invention.

FIG. 7 further describes the billing modification processing of the invention. Central to the invention is recognition by the PWN, and specifically the MTSO, that the caller is accessing the invention. The PWN identifies the caller as a local subscriber or a roamer at decision box 280. Local callers are automatically granted access to the system and the call billing file is altered to delete any charges to the caller for the call, at 281. In addition, a special billing record is established for the third party service provider at 282 including accessing the third party provider's plan, as necessary. The call is then processed at 284.

If the determination at decision box 280 is that the caller is roaming, the MTSO central processor next determines if the caller's service provider will allow treatment of the call as local, with the attendant third party billing at 285. If the service provider, to which the roamer is a subscriber, has agreed to allow roamers to be treated as local for purposes of using the present invention, the roamer's service provider is bypassed and no billing or call information is forwarded. A third party billing record is created at 282 and the call progresses at 284.

If the roamer's home carrier has not established a protocol for allowing its roamers to be treated as locals on the system (i.e., a "no" determination at decision box 285), then the roaming caller is notified at 286 that they have been identified as a roamer and that access to the cellular linking system will only be provided if the caller agrees to accept airtime charges. If a caller acknowledges acceptance of such charges, by depressing SEND or by other means conveying a "yes" decision for box 287, the acceptance is confirmed at 288 and the caller is permitted access at 286 and is charged in a traditional manner.

If the roamer's home carrier has not established a protocol for allowing its roamers to be treated as locals on the system and the roaming caller fails to acknowledge acceptance of airtime charges at 287, then the roaming caller is blocked from the service at 289.

Figure 8:
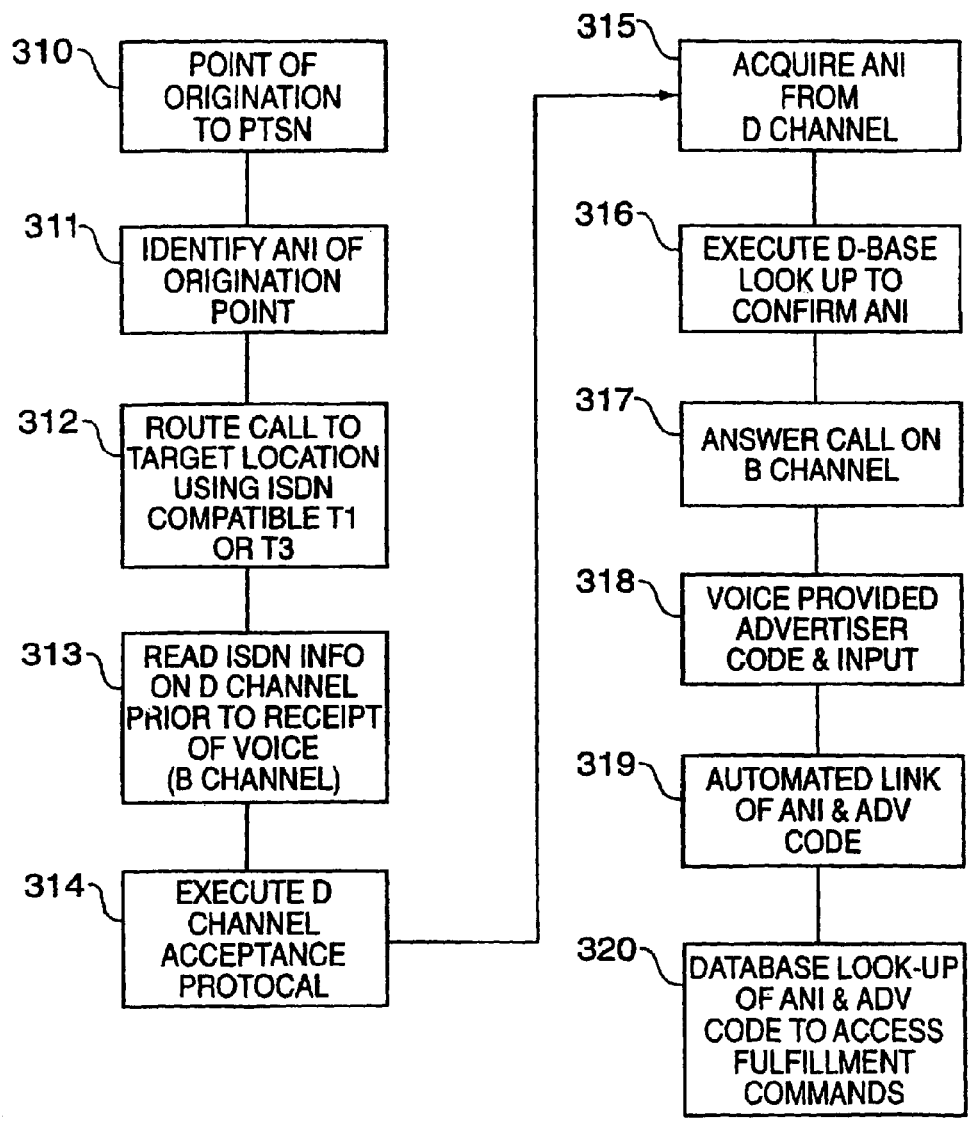
FIG. 8 illustrates a flow diagram of the system illustrating how digits are processed using ISDN technology in an embodiment of the invention.

FIG. 8 provides a detailed description of the call processing in accordance with the present invention when ISDN technology is available. The long distance carrier's data base functions are central to the implementation of the present invention which relies on ISDN technology. ISDN provides a common architecture for the development and deployment of digitally integrated communications services, using out-of-band signaling to permit the user's equipment and the PSTN to exchange control and signaling information over a separate channel from that which carries voice or other user information. ISDN lines are divided into bearer ("B") channels and a supervisory control or data ("D") channel. The D channel is used for out-of-band signaling and the B channels carry digitally encoded voice or other traffic. The D channel also carries information about caller identification which can be used in the present invention to determine approximate geographic location.

The invention utilizes ISDN technology to acquire the ANI of the LEC, MTSO, or caller and combine the geographic locator element of this ANI with the advertiser identifier to create an unique advertiser code and access fulfillment commands. At 310, the call is received at the PTSN, the identity of the ANI is checked at 311, and the call is routed to the target location at 312. The ISDN information is read on the D channel at 313, the D channel protocol conducted at 314, and the ANI verification conducted at 315 and 316. Once the ANI has been confirmed, the call is answered on the B channel at 317, with audible prompting to the caller being provided at 318. The ANI and the advertiser code (from the caller) will be linked at 319 and the database accessed at 320 in order to fulfill the call (i.e., retrieve and deliver the advertiser's message).

Figure 9:
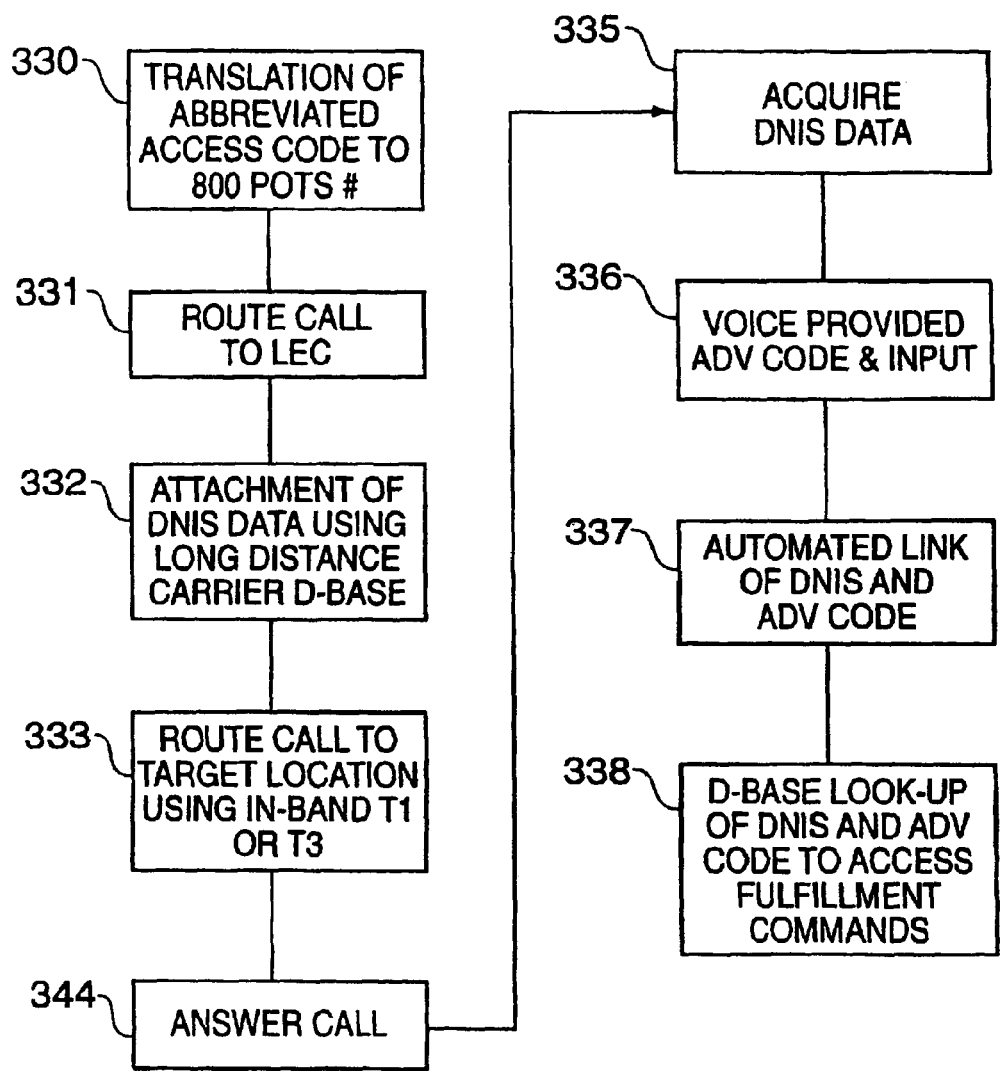
FIG. 9 provides a flow diagram of one embodiment illustrating how digits are processed using DNIS technology.

FIG. 9 is a process flow utilized by the present invention when implemented with DNIS technology. DNIS technology allows the PSTN to transport information on the number dialed or in this application the POTS "800" number translated by a given wireless provider. Such information can then be read by the target location to determine via a preassigned look-up table the approximate geographic location of the caller. Variants of the present invention which rely only on DNIS technology may utilize T1 access with in-band signaling only.

Upon translation of the access code to the 800 POTS number, at 330, the call is routed to the LEC at 331. Attachment of the DNIS data using the long distance carrier database is conducted at 332 and the call routed to the target location at 333. At the target location, the call is answered at 334, the DNIS data received at 335 and the caller prompted to provide the advertiser's code at 336. Linking of the DNIS and the advertiser's code is conducted at 337 followed by accessing of the fulfillment information. The inventive process thus utilizes DNIS technology to acquire the ANI of the transcribed POTS "800" number and combine the geographic locator element of this ANI with the advertiser identifier to create an unique advertiser code at 336 and to access fulfillment commands at 338.

Figure 10:
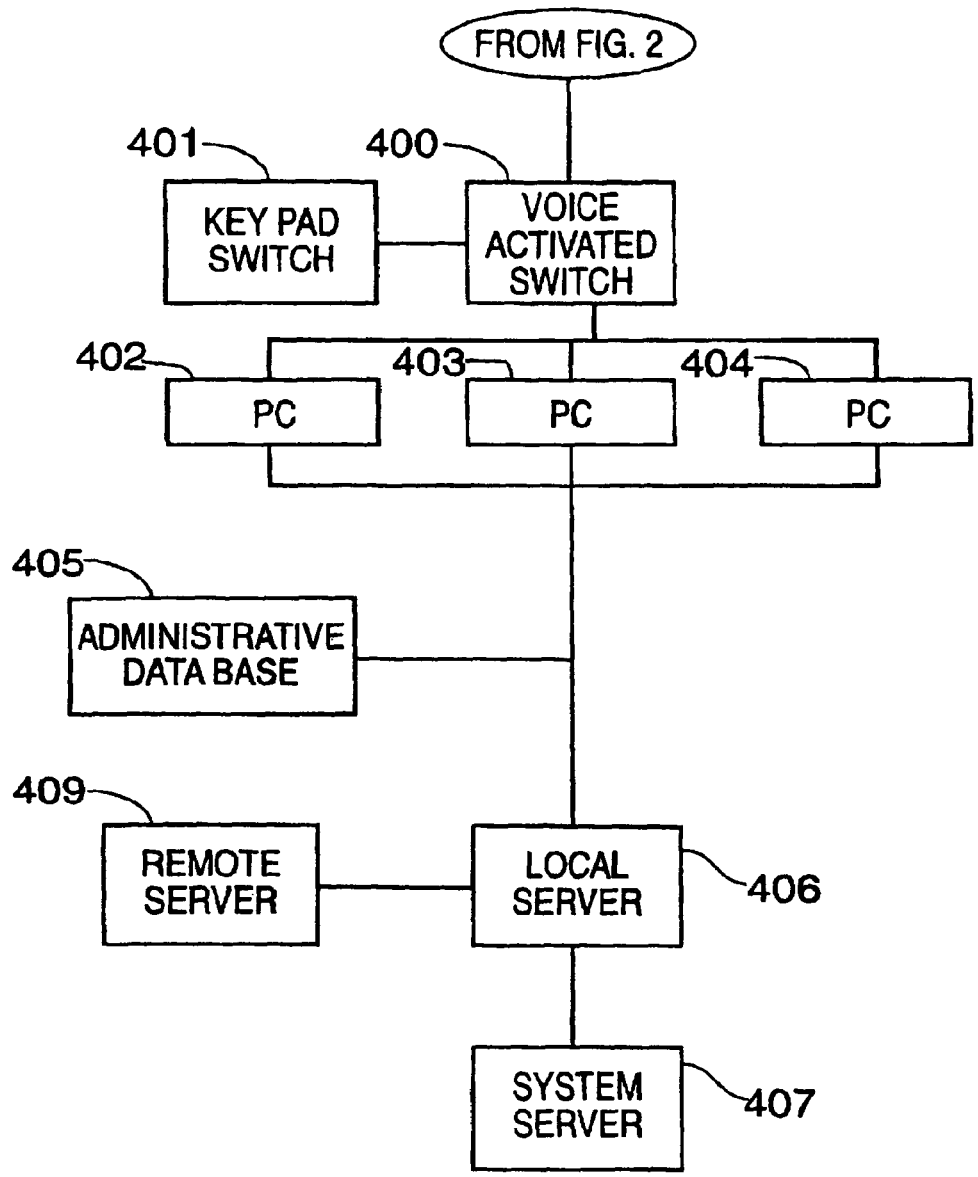
FIG. 10 provides a block diagram of the interconnected components required at the target or processing location of the call pursuant to one embodiment of the invention.

FIG. 10 further describes the components of the invention related to the target, or fulfillment, location. The target or fulfillment location may include a voice activated switch 400 to welcome the user and prompt verbal entry of a required alphanumeric code. An alternative key pad switch 401 may be available for receipt of keyed input of the required code. When the caller provides an audible identifier for interpretation by speech recognition software at the system's messaging center, inability to recognize an identifier, whether incorrect or unrecognizable for other reasons, will result in a prompt for the caller to repeat the audible identifier. If still not recognized as correct, the system will prompt the caller to enter the identifier using the phone keypad. In some instances, a live operator may answer the call and deliver the request for an identifier or trigger a recorded message requesting the identifier. The operator would then retrieve the advertiser specific files manually or by entry to one of a plurality of networked PC's, 402-404, after hearing the user speak the alphanumeric code.

Whether automatically or manually queued, the front end PC's select the relevant advertiser file, deliver the advertiser message and, if necessary, route the call for further processing (e.g., demographics information gathering; sweepstakes entry; caller ordering with attendant information gathering including credit card or other personal account billing verification based upon input provided by the user either by magnetic card reading or secured transmission of alphanumeric information entered by the caller at the time of ordering or preprogrammed into the telephone, which may be conducted directly by an entity at the messaging center or may require transfer of the call to the advertiser's order desk; survey participation, appointment scheduling; etc). As appropriate, one or more local servers 406, or one or more remote servers 409, receives call fulfillment information, as does the system provider server 407 for tracking of system use, advertiser and caller demographics and billing data, etc.

The system's target or fulfillment center also includes a customized administrative database 405 which notes the time of calls, duration of calls, location of caller, number of calls for each identifier, monitors volume and other physical parameters of a call, and administrates billing of calls. Other database information which may be stored and/or updated includes a caller's social security number, address, credit or debit card number, sizing and credit history. In those variants of the present invention which utilize ISDN technology, the target location uses an ISDN compatible switch with T1 or T3 cards, such as the Varilink CSU Model 551 or Northern Telecom's SL1 Meridian Model Option 81. ISDN processing also requires Extended Super Frame (ESF) Binary Eight Zero Suppression (B8ZS) signaling.

Figure 11:
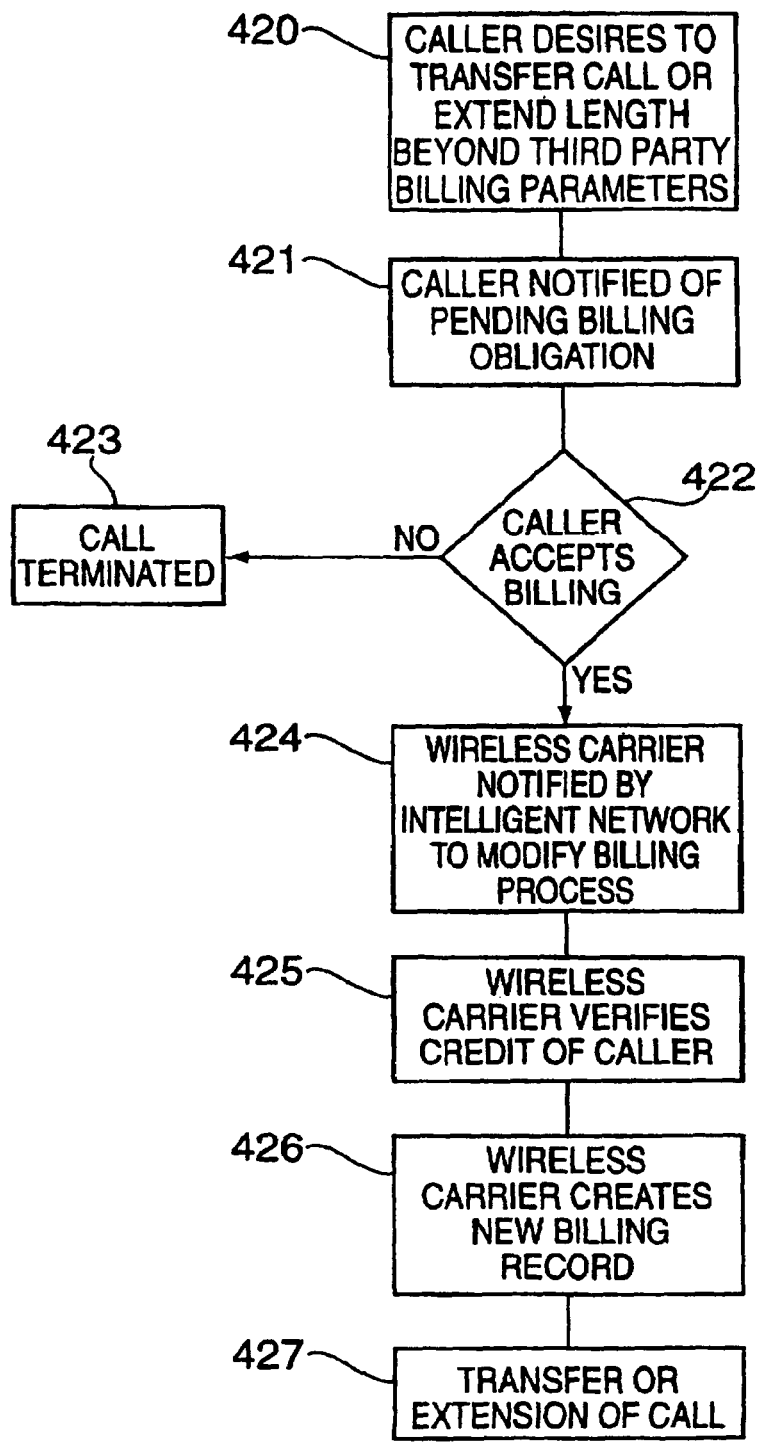
FIG. 11 is a flow chart showing advanced billing features pursuant to yet another embodiment of the invention.

FIG. 11 describes the advanced billing process flow for the present invention. Although one of the objectives of the system is to control call length to be within predefined parameters established by the advertiser and the third party service provider, call length can be extended if the caller so desires and is willing to incur the additional expense of the call. In that way, extended communication with the advertiser, their dealer or representative can be provided without requiring the caller to initiate a second call.

FIG. 11 describes the process whereby the billing of the wireless land-based telephony charges revert back to the caller from a given point during the pendency of the call. If, at 420, the caller desires to transfer the call, or to extend the duration of the call beyond the time preset by the third party billing arrangement and monitored by the system, the caller is notified, at 421, of the caller's need to accept billing responsibility for the remainder of the call. At decision box 422, the system ascertains whether the caller is willing to accept the billing responsibility. If not, the call is terminated at 423. If, however, the caller will accept billing, the system notifies the wireless carriers to modify the billing process at 424. The wireless carrier then verifies the caller's credit at 425 and creates a new billing records at 426. Thereafter, the call is extended, or transferred as required, at 427.

Such billing reconfiguration requires utilization of the intelligent network such as ISDN in order to signal the wireless provider of the need to modify is billing process. If transfer is required, the call is transferred to a second target location using traditional POTS means.

The wireless mobile communications system as taught provides that the caller not be charged for any connection or service time but rather the targeted receiver is charged for the call using a specific dialing prefix. In the alternative, the targeted receiver can be charged for the call based upon a specific and dedicated frequency to be used for all such calls. Yet another arrangement provides the targeted receiver be charged for the call based upon a specific and dedicated numbering code to be used for all such calls.

A final billing arrangement can provide that the wireless receiver of a call is not charged for any connection or service time but rather the caller is charged for the call based upon:

(A) A "collect call" type system wherein the key pad of the receiving cellular phone or other wireless communications device affirmatively indicates that the caller willing to pay charges.

(B) A "collect call" type system wherein some non-key pad indicator on the receiving cellular phone or other wireless communications device affirmatively indicates that the caller willing to pay charges.

(C) The receiving wireless caller answering the call by pressing >send! alone to answer or >send! plus a second key such as >#! or >*!.

Several advanced system features may be incorporated to enhance the capabilities of the inventive system, including an encryption system to secure financial data transmission; automatic downloading of data to the caller's wireless phone or via the phone receiver to other vehicle systems; concurrent transmission of voice and data; and integration of automatic directories of advertiser's codes.

Additional advantages and modifications will readily occur to those skilled in the art. Therefore, the invention in its broader aspects is not limited to the specific details provided herein. Accordingly, departure may be made from such details without departing from the spirit and scope of the appended claims.

Those skilled in the art will appreciate that variations from the specific embodiments disclosed above are contemplated by the invention. The invention should not be restricted to the above embodiments, but should be measured by the following claims.

What is claimed is:

1. A system for providing information comprising:
   a wireless switch to:
      receive at least one communication transmitted from a wireless telecommunications transmitting and receiving device, the at least one communication comprising an access code and information regarding a subscriber comprising a subscriber identification and information beyond subscriber identification, the subscriber identification being an identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and
      determine a destination for directing information from the at least one communication based on the access code, the information from the at least one communication comprising the subscriber identification and information beyond subscriber identification; and
   a fulfillment center comprising at least one computer to:
      receive the information from the at least one communication at the destination; and
      provide relevant information as a function, at least in part, of the subscriber identification and information beyond subscriber identification, as designated by the access code, for receipt by the wireless telecommunications transmitting and receiving device.

2. The system of claim 1 wherein the fulfillment center:
   receives at least one input transmitted from the wireless telecommunications transmitting and receiving device; and
   automatically takes an information-providing action as a function, at least in part, of the at least one input.

3. The system of claim 1 wherein the at least one communication comprises speech from a user, and wherein the fulfillment center:
   receives the speech;
   recognizes the speech; and
   automatically takes an information-providing action as a function, at least in part, of the recognized speech.

4. The system of claim 1 wherein the relevant information comprises downloadable data.

5. The system of claim 1 wherein the relevant information comprises coupon information.

6. The system of claim 1 wherein the relevant information comprises at least one of: voice, data, concurrent voice and data, video information, audio information, financial data, and information provided in visual form.

7. The system of claim 1 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device.

8. The system of claim 1 wherein the subscriber identification comprises at least one of an automatic number identifier (ANI) of the wireless telecommunications transmitting and receiving device, an electronic serial number (ESN) of the wireless telecommunications transmitting and receiving device, a mobile identification number (MIN) of the wireless telecommunications transmitting and receiving device, and an international mobile station identifier (IMSI) of the wireless telecommunications transmitting and receiving device.

9. The system of claim 1 wherein the information beyond subscriber identification comprises at least one of the wireless service provider, the mobile station type, the geographic location, a billing number, a subscriber name, a subscriber billing address, a base station controller (BSC), a mobile switching center (MSC), a home location register (HLR) for fixed mobiles, a subscriber priority indication, a priority access & channel assignment (PACA) level, and a preferred language.

10. The system of claim 1 wherein one or more identifiers are automatically appended to the communication with the access code by the wireless telecommunications transmitting and receiving device.

11. The system of claim 1 wherein the wireless switch further determines if the wireless telecommunications receiving device is roaming or local.

12. The system of claim 1 wherein the wireless switch further determines a billing status of the wireless telecommunications receiving device.

13. A system for providing information for receipt by a wireless telecommunications transmitting and receiving device, the system comprising:
   a switch of a wireless network to:
      receive at least one communication transmitted from the wireless telecommunications transmitting and receiving device via the wireless network, the at least one communication comprising an access code and information regarding a subscriber comprising a subscriber identification and information beyond subscriber identification, the subscriber identification being an identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, a fewer number of characters than an ordinary telephone number, and a non-alphabetic/non-numeric character as a first character; and determine a destination for directing information from the at least one communication based upon the access code, the information from the at least one communication comprising the subscriber identification and the information beyond subscriber identification; and a fulfillment center at the destination comprising at least one computer to:

receive the subscriber identification and the information beyond subscriber identification; and provide targeted information as a function, at least in part, of the subscriber identification and the information beyond subscriber identification for receipt by the wireless telecommunications transmitting and receiving device.

14. The system of claim 13 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device.

15. The system of claim 13 wherein the fulfillment center:

receives at least one input from the wireless telecommunications transmitting and receiving device; and automatically takes an information-providing action as a function, at least in part, of the at least one input.

16. A system for providing information for receipt by a wireless telecommunications transmitting and receiving device, the system comprising:

a wireless switch to:

receive at least one communication transmitted from the wireless telecommunications transmitting and receiving device, the at least one communication comprising an access code and information regarding a subscriber comprising a subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a caller geographic location, an advertiser identifier, and a product identifier, the access code comprising a plurality of characters, a fewer number of characters than an ordinary telephone number, and a non-alphabetic/non-numeric character as a first character; and determine a destination for directing information from the at least one communication, the information from the at least one communication comprising the subscriber identification and the information other than subscriber identification; and a fulfillment center at the destination comprising at least one computer to:

receive the information from the at least one communication; and provide relevant information as a function, at least in part, of the subscriber identification and information other than subscriber identification for receipt by the wireless telecommunications transmitting and receiving device.

17. The system of claim 16 wherein the fulfillment center is in a wireless telecommunication network.

18. The system of claim 17 wherein the wireless telecommunication network is compatible with at least one member of a group of technologies consisting of:

GSM;
TDMA;
CDMA; and
PCS.

19. The system of claim 16 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device.

20. The system of claim 16 wherein the fulfillment center:

receives at least one input transmitted from the wireless telecommunications transmitting and receiving device; and automatically takes an information-providing action as a function, at least in part, of the at least one input.

21. The system of claim 16 wherein the fulfillment center provides the relevant information by accessing stored information and transmitting at least a portion of the stored information for receipt by the wireless telecommunications transmitting and receiving device.

22. The system of claim 16 wherein the access code comprises indicia of at least one of the fulfillment center at the destination and the relevant information.

23. The system of claim 16 wherein the wireless switch verifies a right to access the fulfillment center.

24. The system of claim 23 wherein the wireless switch verifies the right to access the fulfillment center by verifying the subscriber.

25. The system of claim 16 wherein the fulfillment center prompts selection of other information via the wireless telecommunications transmitting and receiving device.

26. The system of claim 25 wherein the fulfillment center receives at least one input transmitted from the wireless telecommunications transmitting and receiving device in response to prompting selection of the other information.

27. The system of claim 26 wherein the fulfillment center takes an information-providing action as a function, at least in part, of the at least one input.

28. The system of claim 16 wherein the fulfillment center provides the relevant information to establish communication between the wireless telecommunications transmitting and receiving device and a live system operator.

29. The system of claim 16 wherein the fulfillment center provides the relevant information by transmitting at least one of voice and data.

30. The system of claim 16 wherein the relevant information provided by the fulfillment center comprises at least one of video and audio.

31. The system of claim 16 wherein the fulfillment center provides the relevant information by downloading information that corresponds to the access code to the wireless telecommunications transmitting and receiving device.

32. The system of claim 31 wherein the downloaded information is displayable on the telecommunications transmitting and receiving device.

33. The system of claim 16 wherein the fulfillment center provides the relevant information to, at least in part, facilitate at least one of:

a consumer transaction;
a financial transaction; and
a promotional exchange.

34. The system of claim 16 wherein the relevant information provided by the fulfillment center comprises coupon information.

35. The system of claim 16 wherein the wireless switch is configured to modify billing procedures associated with the wireless telecommunications transmitting and receiving device in response to the access code.

36. The system of claim 16 wherein the fulfillment center provides the relevant information free of charge to the subscriber.

37. A system for providing information comprising:
a fulfillment center comprising at least one computer to:
receive information from at least one communication transmitted from a wireless telecommunications transmitting and receiving device with an access code, the information from the at least one communication comprising information regarding a subscriber comprising a subscriber identification and information beyond subscriber identification, the subscriber identification being an identification uniquely identifying the wireless telecommunications transmitting and device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and
provide relevant information as a function, at least in part, of the subscriber identification and information beyond subscriber identification for receipt by the wireless telecommunications transmitting and receiving device.

38. The system of claim 37 wherein the information beyond subscriber identification consists at least one of the advertiser identifier and the product identifier.

39. The system of claim 37 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device.

40. The system of claim 37 wherein the fulfillment center:
receives at least one input transmitted from the wireless telecommunications transmitting and receiving device; and
automatically takes an information-providing action as a function, at least in part, of the at least one input.

41. The system of claim 37 wherein the fulfillment center provides the relevant information to facilitate at least one of:
a consumer transaction;
a financial transaction; and
a promotional exchange.

42. The system of claim 37 wherein the relevant information comprises data and the fulfillment center provides the relevant information by determining the data and automatically downloading the data to the wireless telecommunications transmitting and receiving device.

43. The system of claim 37 wherein the relevant information comprises coupon information.

44. The system of claim 37 wherein the relevant information comprises information that corresponds to the access code.

45. The system of claim 37 wherein providing the relevant information comprises connecting the wireless telecommunications transmitting and receiving device to a live system operator from the fulfillment center.

46. The system of claim 37 wherein the relevant information comprises at least one of: voice, data, concurrent voice and data, video information, audio information, financial data, and information provided in visual form.

47. The system of claim 37 wherein the fulfillment center provides the relevant information free of charge to the subscriber.

48. The system of claim 37 wherein the access code comprises indicia of at least one of the fulfillment center and the relevant information.

49. The system of claim 37 wherein the fulfillment center is in a cellular communications system.

50. A method for providing information comprising:
receiving at least one communication transmitted from a wireless telecommunications transmitting and receiving device, the at least one communication comprising an access code and information regarding a subscriber comprising a subscriber identification, and information beyond subscriber identification, the subscriber identification being an identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character;
determining a destination for directing information from the at least one communication, the information from the at least one communication comprising the subscriber identification and information beyond subscriber identification;
receiving the information from the at least one communication at at least one fulfillment center computer at the destination; and
providing, by the at least one fulfillment center computer, relevant information as a function of, at least in part, the subscriber identification and information beyond subscriber identification for receipt by the wireless telecommunications transmitting and receiving device.

51. The method of claim 50 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the information beyond subscriber identification consists at least one of the advertiser identifier and the product identifier and providing the relevant information by the at least one fulfillment center computer as the function, at least in part, of the subscriber identification and information beyond subscriber identification comprises providing the relevant information by the at least one fulfillment center computer as the function, at least in part, of the subscriber identification and the at least one of the advertiser identifier and the product identifier.

52. The method of claim 50 comprising:
receiving at least one input transmitted from the wireless telecommunications transmitting and receiving device; and
automatically taking at least one information-providing action at the at least one fulfillment center computer as a function, at least in part, of the at least one input.

53. A method for providing information for receipt by a wireless telecommunications transmitting and receiving device, the method comprising:
receiving at least one communication transmitted from the wireless telecommunications transmitting and receiving device at a switch, the at least one communication comprising an access code and information regarding a subscriber comprising a subscriber identification and information beyond subscriber identification, the subscriber identification being an identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, a fewer number of characters than an ordinary telephone number, and a non-alphabetic/non-numeric character as a first character;
determining a destination for directing information from the at least one communication, the information from the at least one communication comprising the subscriber identification and the information beyond subscriber identification;
receiving the subscriber identification and the information beyond subscriber identification at at least one fulfillment center computer at the destination; and
providing targeted information by the at least one fulfillment center computer as a function, at least in part, of the subscriber identification and the information beyond subscriber identification for receipt by the wireless telecommunications transmitting and receiving device.

54. The method of claim 53 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the information beyond subscriber identification consists at least one of the advertiser identifier and the product identifier and providing the relevant information by the at least one fulfillment center computer as the function, at least in part, of the subscriber identification and information beyond subscriber identification comprises providing the relevant information by the at least one fulfillment center computer as the function, at least in part, of the subscriber identification and the at least one of the advertiser identifier and the product identifier.

55. The method of claim 53 comprising:
receiving at least one input transmitted from the wireless telecommunications transmitting and receiving device at the at least one fulfillment center computer; and
automatically taking at least one information-providing action by the at least one fulfillment center computer as a function, at least in part, of the at least one input.

56. A method for providing information for receipt by a wireless telecommunications transmitting and receiving device, the method comprising:
receiving at least one communication transmitted via a wireless network from the wireless telecommunications transmitting and receiving device, the at least one communication comprising an access code and information regarding a subscriber comprising subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a caller geographic location, an advertiser identifier, and a product identifier, the access code comprising a plurality of characters, a fewer number of characters than an ordinary telephone number, and a non-alphabetic/non-numeric character as a first character;
determining a destination for directing information from the at least one communication, the information from the at least one communication comprising the subscriber identification and the information other than subscriber identification;
receiving the information from the at least one communication at at least one fulfillment center computer; and
providing relevant information by the at least one fulfillment center computer as a function, at least in part, of the information regarding the subscriber and information other than subscriber identification for receipt by the wireless telecommunications transmitting and receiving device.

57. The method of claim 56 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the information other than subscriber identification consists at least one of the advertiser identifier and the product identifier and providing the relevant information by the at least one fulfillment center computer as the function, at least in part, of the subscriber identification and information other than subscriber identification comprises providing the relevant information by the at least one fulfillment center computer as the function, at least in part, of the subscriber identification and the at least one of the advertiser identifier and the product identifier.

58. The method of claim 56 comprising:
receiving at least one input transmitted from the wireless telecommunications transmitting and receiving device; and
automatically taking at least one information-providing action by the at least one fulfillment center computer as a function, at least in part, of the at least one input.

59. A method for providing information comprising:
receiving, at at least one fulfillment center computer, information from at least one communication transmitted from a wireless telecommunications transmitting and receiving device with the access code, the information from the at least one communication comprising information regarding a subscriber comprising a subscriber identification and information beyond subscriber identification, the subscriber identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and providing relevant information by the at least one fulfillment center computer as a function, at least in part, of the subscriber identification and information beyond subscriber identification for receipt by the wireless telecommunications transmitting and receiving device.

60. The method of claim 59 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the information beyond subscriber identification consists at least one of the advertiser identifier and the product identifier and providing the relevant information by the at least one fulfillment center computer as the function, at least in part, of the subscriber identification and information beyond subscriber identification comprises providing the relevant information by the at least one fulfillment center computer as the function, at least in part, of the subscriber identification and the at least one of the advertiser identifier and the product identifier.

61. The method of claim 59 comprising:
receiving at least one input transmitted from the wireless telecommunications transmitting and receiving device; and
automatically taking at least one information-providing action by the at least one fulfillment center computer as a function, at least in part, of the at least one input.

62. The method of claim 59 wherein the relevant information comprises data and providing the relevant information by the at least one fulfillment center computer as the function, at least in part, of the subscriber identification and information beyond subscriber identification comprises determining the data as the function, at least in part, of the subscriber identification and information beyond subscriber identification and automatically downloading the data to the wireless telecommunications transmitting and receiving device.

63. The method of claim 59 wherein the relevant information comprises coupon information and providing the relevant information comprises providing the coupon information.

64. The method of claim 59 wherein the relevant information comprises information that corresponds to the access code and providing the relevant information comprises providing the information that corresponds to the access code.

65. The method of claim 59 wherein providing the relevant information comprises connecting the wireless telecommunications transmitting and receiving device to a voice response unit.

66. The method of claim 59 wherein:
the relevant information comprises at least one member of a group consisting of: voice, data, concurrent voice and data, video information, audio information, financial data, and information provided in visual form; and
providing the relevant information comprises providing the at least one member of the group.

67. The method of claim 59 further comprising providing the relevant information by the at least one fulfillment center computer free of charge to the subscriber.

68. The method of claim 59 wherein the access code comprises indicia of at least one of the fulfillment center and the relevant information.

69. A system for providing service comprising:
a fulfillment center comprising at least one computer to:
receive at least one communication comprising an access code dialed from a wireless telecommunications transmitting and receiving device and information regarding a subscriber comprising subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a caller geographic location, an advertiser identifier, and a product identifier, the access code comprising a plurality of characters, a fewer number of characters than an ordinary telephone number, and at least one non-alphabetic/non-numeric character as a first character; and
deliver at least one service to the wireless telecommunications transmitting and receiving device based at least in part on the subscriber identification and the information other than subscriber identification.

70. The system of claim 69 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and delivering the at least one service to the wireless telecommunications transmitting and receiving device comprises at least one of transmitting data to the wireless telecommunications transmitting and receiving device and downloading data to the wireless telecommunications transmitting and receiving device.

71. A system for providing information comprising:
a fulfillment center at a destination corresponding to an access code comprising at least one computer to:
receive, via a cellular telephone communications system, information from at least one communication transmitted from a wireless telecommunications transmitting and receiving device with the access code, the information from the at least one communication comprising information regarding a subscriber comprising a subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and
provide relevant information as a function, at least in part, of the subscriber identification and information other than subscriber identification for receipt by the wireless telecommunications transmitting and receiving device.

72. The system of claim 71 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the relevant information comprises data.

73. A system for providing information comprising:
a fulfillment center comprising at least one computer to:
receive information from at least one communication transmitted from a wireless telecommunications transmitting and receiving device with the access code, the information from the at least one communication comprising information regarding a subscriber comprising subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a caller geographic location, an advertiser identifier, and a product identifier, the access code comprising a plurality of characters, fewer characters than an ordinary telephone number, and a non-alphabetic/non-numeric character as a first character; and
provide relevant information as a function, at least in part, of the subscriber identification and information other than subscriber identification for receipt by the wireless telecommunications transmitting and receiving device.

74. The system of claim 73 wherein the information other than subscriber identification consists at least one of the advertiser identifier and the product identifier.

75. The system of claim 73 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device.

76. The system of claim 73 wherein the fulfillment center:
receives at least one input transmitted from the wireless telecommunications transmitting and receiving device; and
automatically takes an information-providing action as a function, at least in part, of the at least one input.

77. The system of claim 73 wherein the relevant information comprises data and the fulfillment center provides the relevant information by determining the data and transmitting the data to the wireless telecommunications transmitting and receiving device.

78. The system of claim 73 wherein the relevant information comprises coupon information.

79. The system of claim 73 wherein the fulfillment center is in a cellular telecommunications system.

80. A method for providing information for receipt by a wireless telecommunications transmitting and receiving device, the method comprising:

receiving at least one communication transmitted from the wireless telecommunications transmitting and receiving device, the at least one communication comprising an access code and information regarding a subscriber comprising a subscriber identification and information other than subscriber identification, the subscriber identification being an identification uniquely identifying the wireless telecommunications transmitting and receiving device, the information other than subscriber identification consisting of at least one member of a group consisting of a wireless service provider, a mobile station type, a subscriber priority indication, a priority access, a caller geographic location, an advertiser identifier, and a product identifier, the access code comprising a plurality of characters, a fewer number of characters than an ordinary telephone number, and a non-alphabetic/non-numeric character as a first character;
determining a destination for directing information from the at least one communication, the information from the at least one communication comprising the subscriber identification and the information other than subscriber identification;
receiving the subscriber identification and the information other than subscriber identification at at least one fulfillment center computer at the destination; and
providing targeted information by the at least one fulfillment center computer as a function, at least in part, of the subscriber identification and the information other than subscriber identification for receipt by the wireless telecommunications transmitting and receiving device.

81. A method for providing information comprising:
receiving, at at least one fulfillment center computer, information from at least one communication transmitted from a wireless telecommunications transmitting and receiving device with the access code via a cellular communications system, the information from the at least one communication comprising information regarding a subscriber comprising subscriber identification and information beyond subscriber identification, the subscriber identification being an identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and
providing relevant information by the at least one fulfillment center computer as a function, at least in part, of the subscriber identification and information beyond subscriber identification for receipt by the wireless telecommunications transmitting and receiving device.

82. The method of claim 81 wherein the subscriber identification consists of at least one member of a group consisting of a phone number of the wireless telecommunications transmitting and receiving device, an automatic number identifier (ANI) of the wireless telecommunications transmitting and receiving device, and a mobile identification number (MIN) of the wireless telecommunications transmitting and receiving device and the information beyond subscriber identification consists at least one of the advertiser identifier and the product identifier and providing the relevant information by the at least one fulfillment center computer as the function, at least in part, of the information regarding the subscriber and information beyond subscriber identification comprises providing the relevant information by the at least one fulfillment center computer as the function, at least in part, of the information regarding the subscriber and the at least one of the advertiser identifier and the product identifier.

83. The method of claim 81 comprising:
receiving at least one input transmitted from the wireless telecommunications transmitting and receiving device; and
automatically taking at least one information-providing action by the at least one fulfillment center computer as a function, at least in part, of the at least one input.

84. The method of claim 81 wherein the relevant information comprises data and providing the relevant information by the at least one fulfillment center computer as the function, at least in part, of the subscriber identification and information beyond subscriber identification comprises determining the data as the function, at least in part, of the subscriber identification and information beyond subscriber identification and transmitting the data to the wireless telecommunications transmitting and receiving device.

85. The method of claim 81 wherein the relevant information comprises coupon information and providing the relevant information comprises providing the coupon information.

86. The method of claim 81 wherein the relevant information comprises information that corresponds to the access code and providing the relevant information comprises providing the information that corresponds to the access code.

87. The method of claim 81 wherein providing the relevant information comprises connecting the wireless telecommunications transmitting and receiving device to a voice response unit.

88. The method of claim 81 wherein:
the relevant information comprises at least one member of a group consisting of: voice, data, concurrent voice and data, video information, audio information, financial data, and information provided in visual form; and
providing the relevant information comprises providing the at least one member of the group.

89. The method of claim 81 wherein the access code comprises indicia of at least one of the fulfillment center and the relevant information.

90. A method for providing information comprising:
receiving, at at least one fulfillment center computer at a destination corresponding to an access code, information from at least one communication transmitted from a wireless telecommunications transmitting and receiving device with the access code via a cellular telecommunications system, the information from the at least one communication comprising information regarding a subscriber comprising a subscriber identification and information beyond subscriber identification, the subscriber identification uniquely identifying the wireless telecommunications transmitting and receiving device, the information beyond subscriber identification consisting of at least one member of a group consisting of a wireless service provider, a mobile station type, a subscriber priority indication, a priority access, a geographic location, an advertiser identifier, and a product identifier, the access code comprising a plurality of characters, fewer characters than an ordinary telephone number, and a non-alphabetic/non-numeric character as a first character; and
providing relevant information by the at least one fulfillment center computer as a function, at least in part, of the subscriber identification and information beyond subscriber identification for receipt by the wireless telecommunications transmitting and receiving device.

* * * * *